(12) United States Patent
Miyajima et al.

(10) Patent No.: US 7,823,080 B2
(45) Date of Patent: Oct. 26, 2010

(54) INFORMATION PROCESSING APPARATUS, SCREEN DISPLAY METHOD, SCREEN DISPLAY PROGRAM, AND RECORDING MEDIUM HAVING SCREEN DISPLAY PROGRAM RECORDED THEREIN

(75) Inventors: Yasushi Miyajima, Kanagawa (JP); Keigo Ihara, Tokyo (JP); Takanori Nishimura, Kanagawa (JP); Junko Fukuda, Kanagawa (JP); Shin Shiroma, Tokyo (JP); Keiichi Yoshioka, Tokyo (JP); Junichiro Sakata, Tokyo (JP)

(73) Assignee: Sony Corporation, Tokyo (JP)

( * ) Notice: Subject to any disclaimer, the term of this patent is extended or adjusted under 35 U.S.C. 154(b) by 1135 days.

(21) Appl. No.: 10/244,415

(22) Filed: Sep. 17, 2002

(65) Prior Publication Data

US 2003/0063125 A1 Apr. 3, 2003

(30) Foreign Application Priority Data

Sep. 18, 2001 (JP) .............................. 2001-284200

(51) Int. Cl.
*G06F 3/00* (2006.01)
*G06F 9/00* (2006.01)
*G06F 17/00* (2006.01)

(52) U.S. Cl. ........................ 715/792; 715/802; 715/781; 715/799

(58) Field of Classification Search ................. 715/802, 715/781, 799, 788, 792
See application file for complete search history.

(56) References Cited

U.S. PATENT DOCUMENTS

| | | | | |
|---|---|---|---|---|
| 5,673,404 | A * | 9/1997 | Cousins et al. | 715/809 |
| 5,940,089 | A * | 8/1999 | Dilliplane et al. | 345/553 |
| 6,229,542 | B1 * | 5/2001 | Miller | 715/782 |
| 6,473,102 | B1 * | 10/2002 | Rodden et al. | 715/788 |
| 6,823,494 | B2 * | 11/2004 | Minoura et al. | 715/800 |
| 6,874,128 | B1 * | 3/2005 | Moore et al. | 715/792 |
| 7,017,121 | B1 * | 3/2006 | Gikas et al. | 715/804 |
| 2002/0044161 | A1 * | 4/2002 | Sugai | 345/781 |

OTHER PUBLICATIONS

Microsoft Windows User's Guide for the Windows Graphical Environment, Version 3.0 pp. 80-86.*

* cited by examiner

*Primary Examiner*—Kieu Vu
*Assistant Examiner*—Sabrina L. Greene
(74) *Attorney, Agent, or Firm*—Oblon, Spivak, McClelland, Maier & Neustadt, L.L.P.

(57) ABSTRACT

In a personal broadcasting system, a user terminal vertically divides a window serving as a main screen into separate elements corresponding to a plurality of functions on a display screen and causes a display unit to display the separate elements side-by-side, the separate elements being a plurality of independent panel windows.

12 Claims, 23 Drawing Sheets

FIG. 2

| NEW PROGRAM RESERVATION |
|---|
| 1 USE AGREE-MENT ▶ 2 INPUT TITLE ▶ 3 SET DISTRI-BUTION DATE ▶ 4 CONFIRM DETAILS ▶ 5 CONNECTION SETTINGS ▶ 6 END |

PROGRAM TITLE  [                    ]
(YOU CAN CHANGE PROGRAM TITLE ON "EDITING OF PROGRAM INTRODUCTION PAGE" LATER.)

DISTRIBUTION ENVIRONMENT
- ⦿ STANDARD 1 (20-46kbps) (VIA GENERAL INTERNET PROVIDER OR LEASED DIAL-UP LINE)
- ☐ STANDARD 2 (20-46kbps) (DISTRIBUTABLE VIA GENERAL INTERNET PROVIDER)
- ☐ BROADBAND (20-220kbps) (DISTRIBUTABLE VIA GENERAL INTERNET PROVIDER)

( RETURN )  ( SET )

FIG. 3

```
NEW PROGRAM RESERVATION
1 USE      ▶2 INPUT  ▶3 SET DISTRI-  ▶4 CONRIRM   ▶5 CONNECTION ▶6 END
  AGREE-      TITLE     BUTION          DETAILS      SETTINGS
  MENT                  DATE
```

YOU CAN CONFIRM TIMETABLE BY SELECTING THE DESIRED DATE FROM CALENDAR BELOW.
PLEASE CHECK VACANCY STATUS.

SEPTEMBER

| SUN. | MON. | TUES. | WEN. | THURS. | FRI. | SAT. |
|---|---|---|---|---|---|---|
|  |  |  |  |  |  | 1 |
| 2 | ■ | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 |  |  |  |  |  |  |

OCTOBER

| SUN. | MON. | TUES | WEN. | THURS. | FRI. | SAT. |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |  |  |  |

NOVEMBER

| SUN. | MON. | TUES. | WEN. | THURS. | FRI. | SAT. |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 |  |

DISTRIBUTION DATE : [9 ▼] MONTH [3 ▼] DAY

START TIME : [14 ▼] HOUR [30 ▼] MINUTE

DISTRIBUTION PERIOD : [60 ▼] MINUTE

DISTRIBUTED CH : [DISTRIBUTE CHANNEL 8 TO TEN PEOPLE ▼]

( RETURN )  ( SET )

FIG. 4

| EDITING OF PROGRAM INTRODUCTION PAGE | | | |
|---|---|---|---|
| 1 RRESERVATION LIST | ▶2 EDIT PROGRAM INTRODUCTION/ PLAYING PAGE | ( ▶3 ※ONLY WHEN TITLE IS CHANGED CONNECTION SETTINGS ) | ▶4 END |

| RESERVATION ID | PC0102x5 |
|---|---|
| CHANNEL | 101 ch(5) |
| RESERVATION TIME | DATE OF RESERVATION: 09/03<br>START TIME: 21:00<br>END TIME: 21:10<br>DISTRIBUTION PERIOD: 10 |

YOU MUST FILL IN "TITLE" AND "VIEWER/LISTENER PASSWORD". WHEN YOU FINISH EDITING PROGRAM, RETURN TO TOP PAGE AND TAKE A LOOK AT INTRODUCTION PAGE.

TITLE: [*******]

※ WHEN YOU CHANGE THE PASSWORD, YOU MUST DOWNLOAD A RESERVATION FILE.

VIEWER/LISTENER PASSWORD: [927]

DISTRIBUTOR NAME: [***]

SUBTITLE: [ ]

PRODUCTION STAFF: [STARRING: ]

OUTLINE OF PROGRAM: [ ]

DETAILS OF PROGRAM: [ ]

[PROGRAM INTRODUCTION PAGE PREVIEW]  [PLAYBACK PAGE PREVIEW]

(RETURN TO RESERVATION LIST)  (SETUP COMPLETED)

FIG. 5

| NEW PROGRAM RESERVATION | | | | | |
|---|---|---|---|---|---|
| 1 USE AGREE- MENT | ▶2 INPUT TITLE | ▶3 SET DISTRI- BUTION DATE | ▶4 CONFIRM DETAILS | ▶5 CONNECTION SETTINGS | ▶6 END |

TITLE:

| DISTRIBUTION DATE | RESERVED TIME | CHANNEL | VIEWER/LISTENER PASSWORD |
|---|---|---|---|
| 09/00 | 22:00 – 22:10 | 8 ch(10) | 821 |

| DISTRIBUTOR PASSWORD |
|---|
| 047659 |

CONNECTION INFORMATION FOR LIVE DISTRIBUTION WILL BE SET TO *****.
PLEASE PERFORM SETTING BY ONE OF THE FOLLOWING METHODS

【SETTING METHOD】

( DOWNLOAD RESERVATION FILE )

( NEXT )

INFORMATION PROCESSING APPARATUS, SCREEN DISPLAY METHOD, SCREEN DISPLAY PROGRAM, AND RECORDING MEDIUM HAVING SCREEN DISPLAY PROGRAM RECORDED THEREIN

BACKGROUND OF THE INVENTION

1. Field of the Invention

The present invention relates to information processing apparatuses including a function for simultaneously displaying a plurality of independent windows on a display screen, a screen display method and a screen display program for simultaneously displaying a plurality of independent windows on a display screen, and a recording medium having the screen display program recorded therein.

2. Description of the Related Art

Recently, information processing apparatuses such as personal computers have become widely used. Many operating systems for controlling the operation of these information processing apparatuses include a multi-window function, which is a function for simultaneously displaying a plurality of windows on a display screen.

In information processing apparatuses including the multi-window function, a plurality of application programs can be running, and a plurality of windows corresponding to these application programs can be displayed on a display screen. In these information processing apparatuses, for example, when a user operates an input operation unit, such as a keyboard or a mouse, the order in which the windows overlap one another can be quickly changed. Also, data can be exchanged and various interlocking operations can be performed between application programs and/or between an application program and the operating system.

In the above-described information processing apparatuses, in many cases, the user is required to perform various setup procedures to execute an application program. In such a case, the information processing apparatus with the multi-window function displays a window serving as a main screen for the application program and an additional dedicated window serving as a setup screen where buttons for allowing the user to perform various setup procedures are disposed.

In the information processing apparatus, for example, when an application program to be setup and another application program are running at the same time, the information processing apparatus simultaneously displays a plurality of windows on the display screen. It is difficult for the user to understand the association between the main screen and the setup screen for the application program to be setup.

When the user performs various setup procedures via the setup screen in the information processing apparatus, it is difficult for the user understand which portion of the corresponding main screen reflects the setting being changed. When portions unnecessary for setup are viewed on the display screen of the information processing apparatus, the user can see a group of buttons unrelated to setup and may become confused.

SUMMARY OF THE INVENTION

In view of the foregoing circumstances, it is an object of the present invention to provide an information processing apparatus for clarifying the association between a main screen and a setup screen and for providing an understandable and flexible screen arrangement for a user, a screen display method, a screen display program, and a recording medium having the screen display program recorded therein.

In order to achieve the foregoing objects, an information processing apparatus according to an aspect of the present invention is an information processing apparatus including a function for simultaneously displaying a plurality of independent windows on a display screen. The information processing apparatus includes a display unit for displaying various information, including the plurality of windows, on the display screen; and a control unit for dividing, on the display screen, a window serving as a main screen into separate elements corresponding to a plurality of functions, in a predetermined direction, and for causing the display unit to display the separate elements side-by-side, the separate elements being a plurality of independent panel windows.

According to the information processing apparatus of the present invention, the window serving as the main screen is divided into the separate elements corresponding to the plurality of functions in the predetermined direction on the display screen, and the display unit displays the separate elements side-by-side, the separate elements being the plurality of independent panel windows. Accordingly, each function's share can be clearly represented, and hence a user can be provided with an interface allowing the user to immediately and easily detect the association between each function and a corresponding necessary operation.

Among the plurality of panel windows forming the window serving as the main screen, the panel window including items which need to be setup may have a panel window serving as a setup screen for setting up the items. The control unit may contract, among the plurality of panel windows forming the window serving as the main screen, the panel windows that are not to be setup in a direction perpendicular to the predetermined direction on the display screen and may expand the panel window to be setup in the direction perpendicular to the predetermined direction on the display screen, thereby causing the display unit to display the panel window serving as the setup screen to be visible.

According to the information processing apparatus of the present invention, the panel windows which are not to be setup may be contracted on the display screen, and the panel window to be setup may be expanded on the display screen. Thus, the panel window serving as the setup screen may become visible. Since the panel windows forming the window serving as the main screen can be displayed in the same display manner as the panel window serving as the setup screen on the display unit, the association between the main screen and the setup screen can be clarified, and a highly-entertaining, easy-to-use, and easy-to-understand interface can be provided to the user.

The information processing apparatus may further include a maintaining unit for maintaining an upper management module, which is a module executed by the control unit and which manages positional information related to the plurality of panel windows forming the window serving as the main screen on the display screen, and a plurality of panel modules, which are modules executed by the control unit and which have the corresponding panel windows forming the window serving as the main screen. The management module may determine the disposition of the plurality of panel windows forming the window serving as the main screen on the display screen on the basis of layout information in accordance with the display screen. The plurality of panel modules may cause the display unit to display, under the control of the management module, the corresponding panel windows forming the window serving as the main screen.

According to the information processing apparatus of the present invention, the management module may manage the positional information related to the plurality of panel windows forming the window serving as the main screen on the display screen. Under the control of the management module, the plurality of panel modules may cause the display unit to display the corresponding panel windows forming the window serving as the main screen. Accordingly, each panel window can be controlled by each panel module and the management module for controlling the layout, the layout being flexible in accordance with the display screen.

In order to achieve the foregoing objects, a screen display method according to another aspect of the present invention is for simultaneously displaying a plurality of independent windows on a display screen. The screen display method includes the step of dividing, on the display screen, a window serving as a main screen into separate elements corresponding to a plurality of functions, in a predetermined direction, and causing a display unit for displaying various information, including the plurality of windows, on the display screen to display the separate elements side-by-side, the separate elements being a plurality of independent panel windows.

According to the screen display method of the present invention, the window serving as the main screen is divided into the separate elements corresponding to the plurality of functions in the predetermined direction on the display screen, and the display unit displays the separate elements side-by-side, the separate elements being the plurality of independent panel windows. Accordingly, each function's share can be clearly represented, and hence a user can be provided with an interface allowing the user to immediately and easily detect the association between each function and a corresponding necessary operation.

Among the plurality of panel windows forming the window serving as the main screen, the panel window including items which need to be setup may have a panel window serving as a setup screen for setting up the items. Among the plurality of panel windows forming the window serving as the main screen, the panel windows that are not to be setup may be contracted in a direction perpendicular to the predetermined direction on the display screen, and the panel window to be setup may be expanded in the direction perpendicular to the predetermined direction on the display screen, thereby causing the display unit to display the panel window serving as the setup screen to be visible.

According to the screen display method of the present invention, the panel windows which are not to be setup may be contracted on the display screen, and the panel window to be setup may be expanded on the display screen. Thus, the panel window serving as the setup screen may become visible. Since the panel windows forming the window serving as the main screen can be displayed in the same display manner as the panel window serving as the setup screen on the display unit, the association between the main screen and the setup screen can be clarified, and a highly-entertaining, easy-to-use, and easy-to-understand interface can be provided to the user.

An upper management module for managing positional information related to the plurality of panel windows forming the window serving as the main screen on the display screen and a plurality of panel modules having the corresponding panel windows forming the window serving as the main screen may be provided. The disposition of the plurality of panel windows forming the window serving as the main screen on the display screen may be determined by the management module on the basis of layout information in accordance with the display screen. The display unit may be caused by the plurality of panel modules to display, under the control of the management module, the corresponding panel windows forming the window serving as the main screen.

According to the screen display method of the present invention, the management module may manage the positional information related to the plurality of panel windows forming the window serving as the main screen on the display screen. Under the control of the management module, the plurality of panel modules may cause the display unit to display the corresponding panel windows forming the window serving as the main screen. Accordingly, each panel window can be controlled by each panel module and the management module for controlling the layout, the layout being flexible in accordance with the display screen.

In order to achieve the foregoing objects, a screen display program according to another aspect of the present invention is a computer-controllable screen display program for simultaneously displaying a plurality of independent windows on a display screen. The screen display program includes the step of dividing, on the display screen, a window serving as a main screen into separate elements corresponding to a plurality of functions, in a predetermined direction, and causing a display unit for displaying various information, including the plurality of windows, on the display screen to display the separate elements side-by-side, the separate elements being a plurality of independent panel windows.

According to the screen display program of the present invention, by executing the screen display program, the window serving as the main screen is divided into the separate elements corresponding to the plurality of functions in the predetermined direction on the display screen, and the display unit displays the separate elements side-by-side, the separate elements being the plurality of independent panel windows. Accordingly, each function's share can be clearly represented, and hence a user can be provided with an interface allowing the user to immediately and easily detect the association between each function and a corresponding necessary operation.

Among the plurality of panel windows forming the window serving as the main screen, the panel window including items which need to be setup may have a panel window serving as a setup screen for setting up the items. Among the plurality of panel windows forming the window serving as the main screen, the panel windows that are not to be setup may be contracted in a direction perpendicular to the predetermined direction on the display screen, and the panel window to be setup may be expanded in the direction perpendicular to the predetermined direction on the display screen, thereby causing the display unit to display the panel window serving as the setup screen to be visible.

According to the screen display program of the present invention, by executing the screen display program, the panel windows which are not to be setup may be contracted on the display screen, and the panel window to be setup may be expanded on the display screen. Thus, the panel window serving as the setup screen may become visible. Since the panel windows forming the window serving as the main screen can be displayed in the same display manner as the panel window serving as the setup screen on the display unit, the association between the main screen and the setup screen can be clarified, and a highly-entertaining, easy-to-use, and easy-to-understand interface can be provided to the user.

An upper management module for managing positional information related to the plurality of panel windows forming the window serving as the main screen on the display screen and a plurality of panel modules having the corresponding panel windows forming the window serving as the main screen may be provided. The disposition of the plurality of panel windows forming the window serving as the main screen on the display screen may be determined by the management module on the basis of layout information in accordance with the display screen. The display unit may be caused by the plurality of panel modules to display, under the control of the management module, the corresponding panel windows forming the window serving as the main screen.

According to the screen display program of the present invention, by executing the screen display program, the management module may manage the positional information related to the plurality of panel windows forming the window serving as the main screen on the display screen. Under the control of the management module, the plurality of panel modules may cause the display unit to display the corresponding panel windows forming the window serving as the main screen. Accordingly, each panel window can be controlled by each panel module and the management module for controlling the layout, the layout being flexible in accordance with the display screen.

In order to achieve the foregoing objects, a recording medium having recorded therein a screen display program according to another aspect of the present invention is a recording medium having recorded therein a computer-controllable screen display program for simultaneously displaying a plurality of independent windows on a display screen. The screen display program includes the step of dividing, on the display screen, a window serving as a main screen into separate elements corresponding to a plurality of functions, in a predetermined direction, and causing a display unit for displaying various information, including the plurality of windows, on the display screen to display the separate elements side-by-side, the separate elements being a plurality of independent panel windows.

According to the recording medium of the present invention, by executing the screen display program, the window serving as the main screen is divided into the separate elements corresponding to the plurality of functions in the predetermined direction on the display screen, and the display unit displays the separate elements side-by-side, the separate elements being the plurality of independent panel windows. Accordingly, each function's share can be clearly represented, and hence a user can be provided with an interface allowing the user to immediately and easily detect the association between each function and a corresponding necessary operation.

Among the plurality of panel windows forming the window serving as the main screen, the panel window including items which need to be setup may have a panel window serving as a setup screen for setting up the items. The screen display program may contract, among the plurality of panel windows forming the window serving as the main screen, the panel windows that are not to be setup in a direction perpendicular to the predetermined direction on the display screen and may expand the panel window to be setup in the direction perpendicular to the predetermined direction on the display screen, thereby causing the display unit to display the panel window serving as the setup screen to be visible.

According to the recording medium of the present invention, by executing the screen display program, the panel windows which are not to be setup may be contracted on the display screen, and the panel window to be setup may be expanded on the display screen. Thus, the panel window serving as the setup screen may become visible. Since the panel windows forming the window serving as the main screen can be displayed in the same display manner as the panel window serving as the setup screen on the display unit, the association between the main screen and the setup screen can be clarified, and a highly-entertaining, easy-to-use, and easy-to-understand interface can be provided to the user.

The screen display program may provide an upper management module for managing positional information related to the plurality of panel windows forming the window serving as the main screen on the display screen and a plurality of panel modules having the corresponding panel windows forming the window serving as the main screen. The screen display program may use the management module to determine the disposition of the plurality of panel windows forming the window serving as the main screen on the display screen on the basis of layout information in accordance with the display screen. The screen display program may use the plurality of panel modules to cause the display unit to display, under the control of the management module, the corresponding panel windows forming the window serving as the main screen.

According to the recording medium of the present invention, by executing the screen display program, information processing apparatus of the present invention, the management module may manage the positional information related to the plurality of panel windows forming the window serving as the main screen on the display screen. Under the control of the management module, the plurality of panel modules may cause the display unit to display the corresponding panel windows forming the window serving as the main screen. Accordingly, each panel window can be controlled by each panel module and the management module for controlling the layout, the layout being flexible in accordance with the display screen.

BRIEF DESCRIPTION OF THE DRAWINGS

FIG. 2 is an illustration of a new program reservation window for inputting the program title of content to be distributed, the new program reservation window being displayed on a display unit of a user terminal included in the personal broadcasting system;

FIG. 3 is an illustration of a new program reservation window for inputting the distribution time and date, the new program reservation window being displayed on the display unit;

FIG. 4 is an illustration of a program introduction page editing window displayed on the display unit;

FIG. 5 is an illustration of a new program reservation window for performing connection settings, the new program reservation window being displayed on the display unit;

DESCRIPTION OF THE PREFERRED EMBODIMENTS

The present invention will be understood from the following description of the preferred embodiments with reference to the accompanying drawings.

Figure 1:
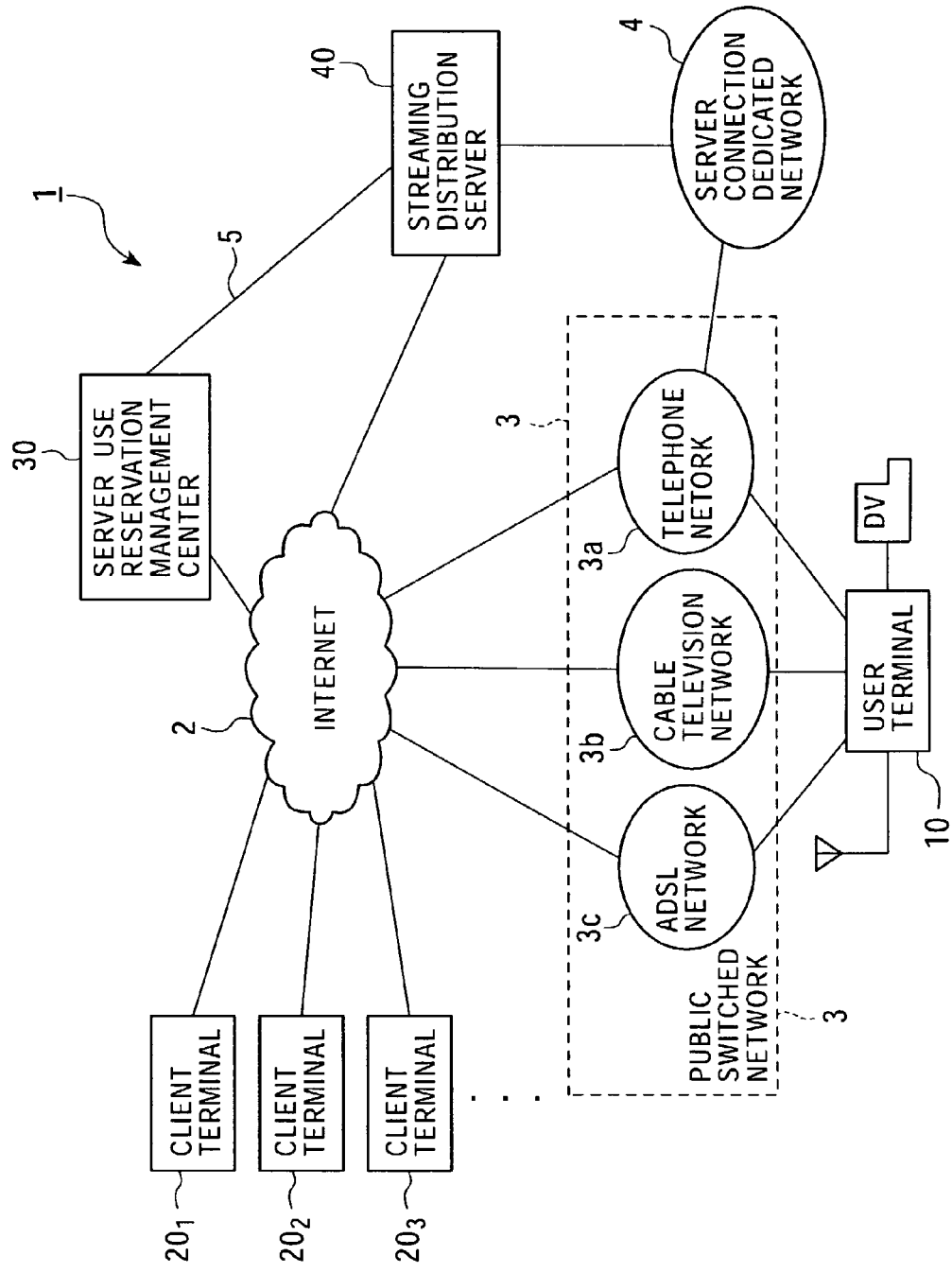
FIG. 1 is a diagram showing the configuration of a personal broadcasting system according to an embodiment of the present invention.

FIG. 1 shows a personal broadcasting system 1 according to an embodiment of the present invention. A user terminal 10 is formed by an information processing apparatus such as a personal computer to which a digital video camera (DV) is attached or connected. Content formed by video and/or audio data captured by the user terminal 10 or edited video and/or audio data stored in the user terminal 10 is distributed live through the Internet 2 to a plurality of client terminals $20_1$, $20_2$, $20_3$, . . . such as personal computers and personal digital assistants (PDAs). This is referred to as a personal casting service.

In the personal broadcasting system 1, the user terminal 10 has a multi-window function for simultaneously displaying a plurality of independent windows on a display screen. In particular, the user terminal 10 can seamlessly change between a window serving as a main screen displayed on the display screen for each function of an application program executed to distribute content formed by desired video and/or audio data and a window serving as a setup screen for allowing a user to perform various setup procedures. Thus, the association between the main screen and the setup screen can be clarified, and a clearer and more understandable user interface can be presented to the user. More specifically, the user terminal 10 introduces the concept of a panel window, which is a separate element generated by vertically dividing a window serving as a main screen on the display screen into units of functions in order to represent each function's share on the display screen. This contributes to realization of the personal casting service by a simple operation.

Prior to a detailed description of the user terminal 10, the personal broadcasting system 1 will now be described.

The personal broadcasting system 1 includes, as shown in FIG. 1, the user terminal 10 for distributing content, a plurality of client terminals $20_1$, $20_2$, $20_3$, . . . for receiving the content distributed by the user terminal 10 in order that the received content can be viewed/listened to, a server use reservation management center 30 for managing reservation information for using a content distributing function of a streaming distribution server 40 described below, and the streaming distribution server 40 for distributing the content distributed by the user terminal 10 to the plurality of client terminals $20_1$, $20_2$, $20_3$, . . . .

The digital video camera is attached or connected to the user terminal 10. The user terminal 10 transmits video and/or audio data captured by the digital video camera while compressing the video and/or audio data in real time in accordance with a predetermined coding format. Also, the user terminal 10 can transmit edited video and/or audio data recorded in a hard disk (not shown).

More specifically, the user terminal 10 is in an environment connectable to the Internet 2 via an internet service provider (ISP) (not shown) or a public switched network 3 formed by, for example, a telephone network $3a$, a cable television network $3b$, or an ADSL (Asymmetric Digital Subscriber line) network $3c$. As long as the user terminal 10 can be in an environment connectable to the Internet 2, connection can be wired or wireless. For example, the user terminal 10 can connect to the Internet 2 via, for example, a so-called personal handy phone system (PHS) telephone. Prior to transmitting content formed by video and/or audio data, the user terminal 10 is required to reserve content distribution at the server use reservation management center 30. The user terminal 10 accesses the server use reservation management center 30 via the public switched network 3 and the Internet 2 and registers predetermined reservation information, such as the desired time and date for using the streaming distribution function of the streaming distribution server 40, the number of viewers/listeners who can access the content, and viewer/listener password, thereby reserving content distribution.

When reservation is accepted, the user terminal 10 transmits the content formed by the video and/or audio data to the streaming distribution server 10. In order to do so, the user terminal 10 transmits the content to the streaming distribution server 40 via the public switched network 3 and the Internet 2. By establishing a PPP (Point to Point Protocol) connection to an access port of a server connection dedicated network 4 via the public switched network 3, the user terminal 10 establishes a transmission line to the streaming distribution server 40, and hence the user terminal 10 can transmit the content to the streaming distribution server 40 via the transmission line. As described below, if necessary, the user terminal 10 can locally record the transmitted content in the hard disk which is a recording medium (not shown).

Each of the client terminals $20_1$, $20_2$, $20_3$, . . . is an information processing apparatus such as a personal computer or a PDA capable of connecting to the Internet 2. By inputting predetermined information such as a viewer/listener password, each of the client terminals $20_1$, $20_2$, $20_3$, . . . can participate as a viewing/listening terminal in the personal broadcasting system 1. When the content distribution start time and date, which is reserved and registered by the user terminal 10 is reached, the content is distributed from the streaming distribution server 40 via the Internet 2 to each of the client terminals $20_1$, $20_2$, $20_3$, . . . , and each of the client terminals $20_1$, $20_2$, $20_3$, . . . receives the distributed content. Each of the client terminals $20_1$, $20_2$, $20_3$, . . . decodes the received content in real time and outputs the content via a display unit or a speaker (not shown).

The server use reservation management center 30 manages reservation information for allowing the user terminal 10 to use the content streaming distribution function of the streaming distribution server 40. When predetermined reservation information is registered at the server use reservation management center 30 by the user terminal 10, the server use reservation management center 30 reserves use of the streaming distribution server 40 by the user terminal 10. The server use reservation management center 30 is connected to the streaming distribution server 40 via a dedicated line 5. When authenticating the user terminal 10 and the client terminals $20_1$, $20_2$, $20_3$, . . . , the server use reservation management center 30 exchanges authentication data with the streaming distribution server 40 via the dedicated line 5.

The streaming distribution server 40 receives the content transmitted from the user terminal 10 via the Internet 2 or the server connection dedicated network 4 and performs streaming distribution of the content via the Internet 2 to the client terminals $20_1$, $20_2$, $20_3$, . . . . At this time, the streaming distribution server 40 is connected to the server use reservation management center 30 via the dedicated line 5. When authenticating the user terminal 10 and the client terminals $20_1$, $20_2$, $20_3$, . . . , the streaming distribution server 40 exchanges authentication data with the server use reservation management center 30 via the dedicated line 5. When the content distribution start time and date, which is reserved and registered by the user terminal 10, is reached, the streaming distribution server 40 receives content transmitted from the user terminal 10 via the Internet 2 or the server connection dedicated network 4 and stores the received content in a buffer (not shown). The streaming distribution server 40 reads the content from the buffer and distributes the content to those of the client terminals $20_1$, $20_2$, $20_3$, . . . which have requested the content to be distributed.

In the personal broadcasting system 1, live distribution of content is reserved by accessing, by a user who will be a content distributor, the server use reservation management center 30 via the user terminal 10 and by registering the above-described registration information.

Specifically, in the personal broadcasting system 1, the display screen of the user terminal 10 displays a WWW (World Wide Web) browsing window for browsing a web site for offering services of the personal broadcasting system 1. The user performs user registration in the personal broadcasting system 1 via the user terminal 10, inputs a given user ID and password, and logs in to the web site. Accordingly, in the personal broadcasting system 1, the display screen of the user terminal 10 displays predetermined windows, such as those shown in FIGS. 2 to 5, for reserving content distribution.

Specifically, the user terminal 10 displays, as shown in FIG. 2, a new program reservation window including a box for filling in the program title of the content to be distributed and selectable items for selecting the type of the streaming distribution server 40, which serves as a distribution environment, that is, a connection method for connecting to the network. In the personal broadcasting system 1, the input program title is included in a list of programs on the web site. In the personal broadcasting system 1, the available distribution bandwidth and connection method are determined in accordance with the selected distribution environment. The user terminal 10 displays, as shown in FIG. 3, a new program reservation window including combo boxes for selecting and inputting the desired distribution date, the distribution start time, and the desired distribution period, which is the duration of the content, or the desired distribution end time, and a combo box for selecting and inputting a distribution channel for distributing the content. In the personal broadcasting system 1, the limit of the number of viewers/listeners who can simultaneously view/listen to the content is determined depending on the distribution channel. In addition to the new program reservation windows, the user terminal 10 displays, on the display screen, as shown in FIG. 4, a program introduction page editing window for introducing the details of the content to be distributed. The user terminal 10 displays, on the display screen, the program introduction page editing window including a box for filling in a viewer/listener password and, if necessary, boxes for filling in the program title, the distributor name, a subtitle, the production staff, the outline of the program, and details of the program. In the personal broadcasting system 1, these various pieces of input information are included in a program introduction page on the web site. The user terminal 10 displays a new program reservation window (not shown) for inputting a credit card number, which is required for billing the user. After all the necessary items are filled in, the user terminal 10 displays, on the display screen, as shown in FIG. 5, a new program reservation window including the desired distribution date, the reservation time, the distribution channel, the viewer/listener password, and a unique distributor password of the distributor.

In the personal broadcasting system 1, the user inputs predetermined reservation information via the windows displayed on the display screen of the user terminal 10. If the user authentication is successful by verifying the credit card number, live distribution of the content at the specified time and date is reserved. In the personal broadcasting system 1, when the reservation of live distribution is accepted, the user presses a reservation file download button on the new program reservation window shown in FIG. 5. Accordingly, a reservation setup file is downloaded from the server use reservation management center 30 to the user terminal 10. The reservation setup file includes the set reservation information, the IP (Internet Protocol) address and port of the streaming distribution server 40 for performing live distribution, user ID, and password. In the personal broadcasting system 1, these pieces of information are automatically read by the user terminal 10 by executing a live distribution application program (described below), so that live distribution can be performed without requiring the user to perform setup.

In the personal broadcasting system 1, the user terminal 10 performs reservation confirmation at the server use reservation management center 30 whether or not the reserved live distribution is actually to be performed a predetermined time, such as three weeks, prior to the distribution start time. More specifically, in the personal broadcasting system 1, the user terminal 10 displays on the display screen thereof the WWW browsing window for gaining access to the server use reservation management center 30. When the user inputs predetermined information via the window, reservation confirmation is performed. In the personal broadcasting system 1, the reservation is established. In the personal broadcasting system 1, the user is required to send, by the distribution start time and date, information required for viewing/listening to the content, such as a viewer/listener password, to a client whom to offer the content to be viewed and listed to.

In the personal broadcasting system 1, a connection is established between the user terminal 10 and the streaming distribution server 40 a predetermined time, such as five minutes, prior to the distribution start time and date. The digital video camera attached or connected to the user terminal 10 captures video and/or audio data, and simultaneously the video and/or audio data is transmitted while being compressed in real time in a predetermined coding format. In the personal broadcasting system 1, a client who will become a viewer/listener inputs predetermined information such as a viewer/listener password when the distribution start time and date is reached. Thus, the client can receive and view/listen to the content via the client terminals $20_1$, $20_2$, $20_3$, . . . .

The personal broadcasting system 1 can implement the personal casting service for live distributing content formed by the video and/or audio data captured by the user terminal 10 or the edited video and/or audio data stored in the user terminal 10 via the Internet 2 to the client terminals $20_1$, $20_2$, $20_3$, . . . .

In the personal broadcasting system 1, after the above-described live distribution is reserved and setup by the user terminal 10, prior to actually starting distribution, the user terminal 10 can setup and register in advance an effect group required for the program and an archive file group recorded in the hard disk of the user terminal 10. The user terminal 10 can perform various setup procedures using a predetermined guide function described below. In the personal broadcasting system 1, the user terminal 10 can perform test capturing of content to be distributed live with respect to the hard disk. At this time, the user terminal 10 can add various effects to the content while the content is actually being distributed, and can switch between the video and/or audio data which is selectable as an input source and which is captured by the digital video camera 60 and the video and/or audio data recorded in the hard disk.

In the personal broadcasting system 1, when a connection is established between the user terminal 10 and the streaming distribution server 40, the content is distributed live. In this state, the user terminal 10 performs effect operations and file switching operations. Accordingly, these operations are reflected in the streaming. Consequently, these operations are reflected in the display screens of the client terminals $20_1$, $20_2$, $20_3$, . . . . In the personal broadcasting system 1, when the distribution end time is reached, the distribution of the content is automatically terminated, and the display screens of the client terminals $20_1$, $20_2$, $20_3$, . . . stop playing the program. In the personal broadcasting system 1, as described hereinafter, information concerning the content whose distribution has been terminated is recorded in the hard disk of the user terminal 10 or a predetermined recording medium. The user terminal 10 can read details of a distribution log and the distributed content, and hence the user can see the read distribution log and the content in the form of an album.

Hereinafter the user terminal 10 forming the personal broadcasting system 1 will now be described in detail. In order to simplify the description, it is assumed that the digital video camera is attached to the user terminal 10.

Figure 6:
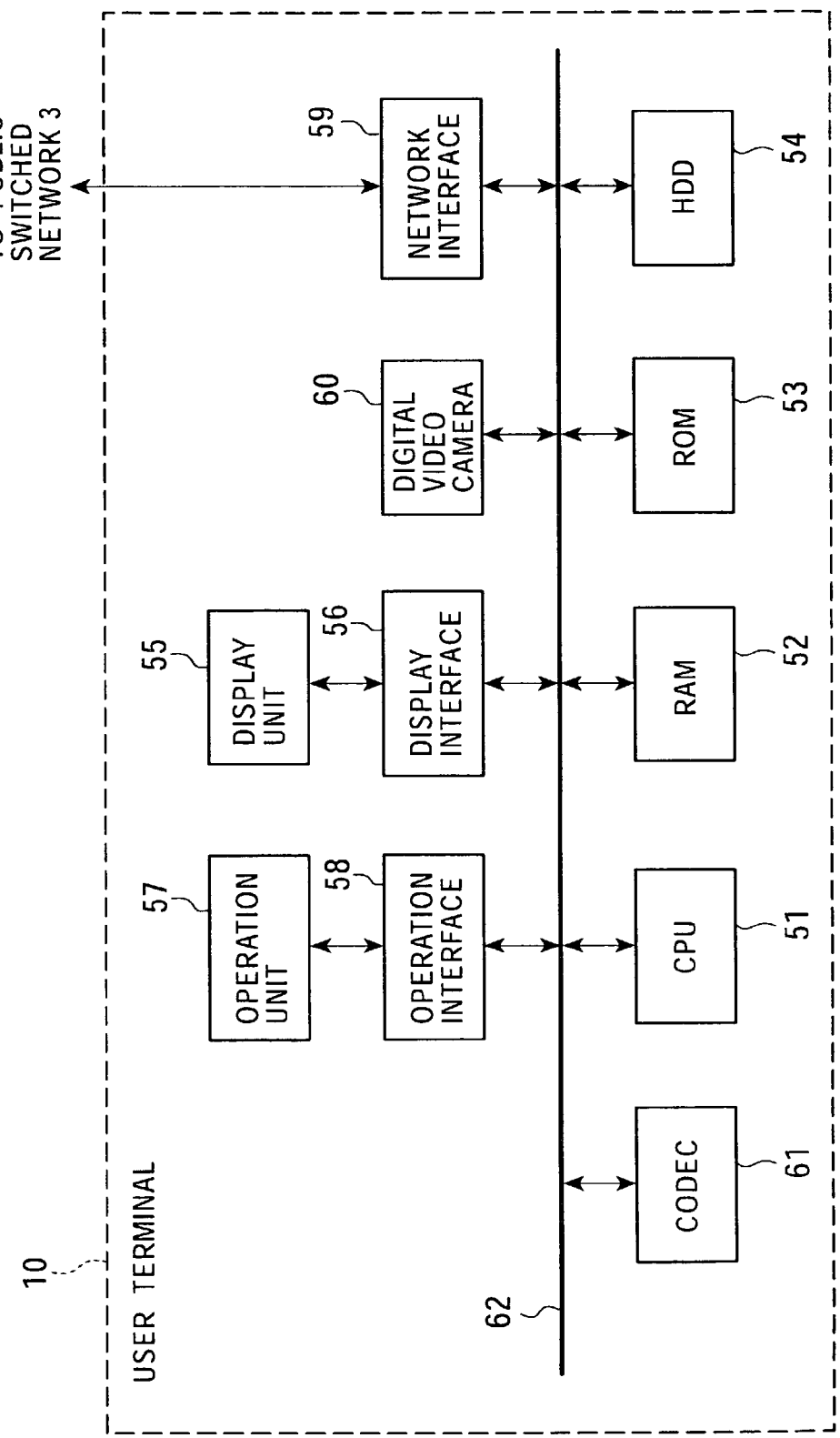
FIG. 6 is a block diagram of the configuration of the user terminal.

As shown in FIG. 6, the user terminal 10 includes a CPU (Central Processing Unit) 51 for performing various arithmetic processes and for controlling all portions; a RAM (Random Access Memory) 52 functioning as a work area for the CPU 51; a ROM (Read Only Memory) 53 for storing information including various programs for execution by the CPU 51; an HDD (Hard Disk Drive) 54 for reading and/or writing various programs such as an operating system and application programs for execution by the CPU 51 and data from/to the hard disk; a display unit 55 for displaying various information on the display screen; a display interface 56 for exchanging data between the display unit 55 and the CPU 51; an operation unit 57 for allowing the user to input various information; an operation interface 58 for exchanging data between the operation unit 57 and the CPU 51; a network interface 59 for exchanging data with an external apparatus connected to the Internet 2 or the server connection dedicated network 4 via the above-described public switched network 3; a digital video camera 60 for capturing an image of a subject and obtaining video and/or audio data; and a codec 61 for performing compression/coding and decoding on the basis of a predetermined coding and decoding format such as a so-called real format. The user terminal 10 is formed by, among these components, the CPU 51, the RAM 52, the ROM 53, the HDD 54, the display interface 56, the operation interface 58, the network interface 59, the digital video camera 60, and the codec 61, all of which are connected to one another via a bus 62.

If the digital video camera 60 is connected to the user terminal 10 instead of being attached thereto, the digital video camera 60 is connected to the bus 62 via a predetermined interface. If necessary, the user terminal 10 may include a drive, which is not shown in FIG. 6, for reading and/or writing various information from/to a removable recording medium.

The CPU 51 is connected via the bus 62 to the RAM 52, the ROM 53, the HDD 54, the display interface 56, the operation interface 58, the network interface 59, the digital video camera 60, and the codec 61. The CPU 51 controls each portion and executes the operating system and various application programs recorded in the HDD 54. In particular, the CPU 51 processes and controls reservation of content distribution at the server use reservation management center 30, transmission of content from the streaming distribution server 40, and recording of the transmitted content in the hard disk.

The RAM 52 functions as a work area for the CPU 51 when the CPU 51 executes various programs. The RAM 52 temporarily stores various data under the control of the CPU 51.

The ROM 53 stores information including various programs, which are read and executed under the control of the CPU 51.

Under the control of the CPU 51, the HDD 54 reads and/or writes various programs such as the operating system and application programs and data from/to the hard disk. In particular, under the control of the CPU 51, the HDD 54 records the transmitted content in the hard disk, which will be described below. Also, the HDD 54 can record edited video and/or audio data in the hard disk. Under the control of the CPU 51, the HDD 54 reads the video and/or audio data.

The display unit 55 is formed by, for example, an LCD (Liquid Crystal Display) or a CRT (Cathode Ray Tube). Under the control of the CPU 51, the display unit 55 displays various information such as data recorded in the HDD 54 on the display screen. In particular, under the control of the CPU 51, the display unit 55 displays, on the display screen, predetermined graphical user interfaces (GUT), such as the WWW browsing window for accessing the server use reservation management center 30 and the streaming distribution server 40 and a predetermined window for executing various application programs for performing various processes including processing of content to be transmitted.

The display interface 56 exchanges data between the CPU 51 and the display unit 55. Specifically, the display interface 56 supplies various information supplied from the CPU 51 via the bus 62 to the display unit 55.

The operation unit 57 accepts operations by the user using user interfaces such as a pointing device, e.g., a keyboard or a mouse, and a so-called jog dial and supplies control signals indicating the contents of the operations via the operation interface 58 to the CPU 51.

The operation interface 58 exchanges data between the CPU 51 and the operation unit 57. Specifically, the operation interface 58 supplies the control signals, which are supplied from the operation unit 57, to the CPU 51 via the bus 62.

The network interface 59 functions as an interface for communicating with the outside under the control of the CPU 51. Specifically, the network interface 59 is provided to exchange data between an external apparatus connected to the Internet 2 or the server connection dedicated network 4 via the public switched network 3 and the user terminal 10. In particular, under the control of the CPU 51, the network interface 59 transmits the content to the outside and transmits/receives various information including the above-described reservation information and the reservation ID.

The digital video camera 60 is formed by a predetermined optical system for capturing an image of a subject and a photoelectric converter device such as a CCD (Charge Coupled Device). Video and/or audio data captured by the digital video camera 60 is supplied to the codec 61 via the bus 62 under the control of the CPU 51.

Under the control of the CPU 51, the codec 61 performs compression/coding of the video and/or audio data supplied from the digital video camera 60 via the bus 62 on the basis of a predetermined coding format such as a real format. At this time, the codec 61 compresses/encodes the video and/or audio data in real time under the control of the CPU 51. Also, the codec 61 can decode the compressed/encoded data on the basis of the predetermined coding format such as the real format.

Figure 7:
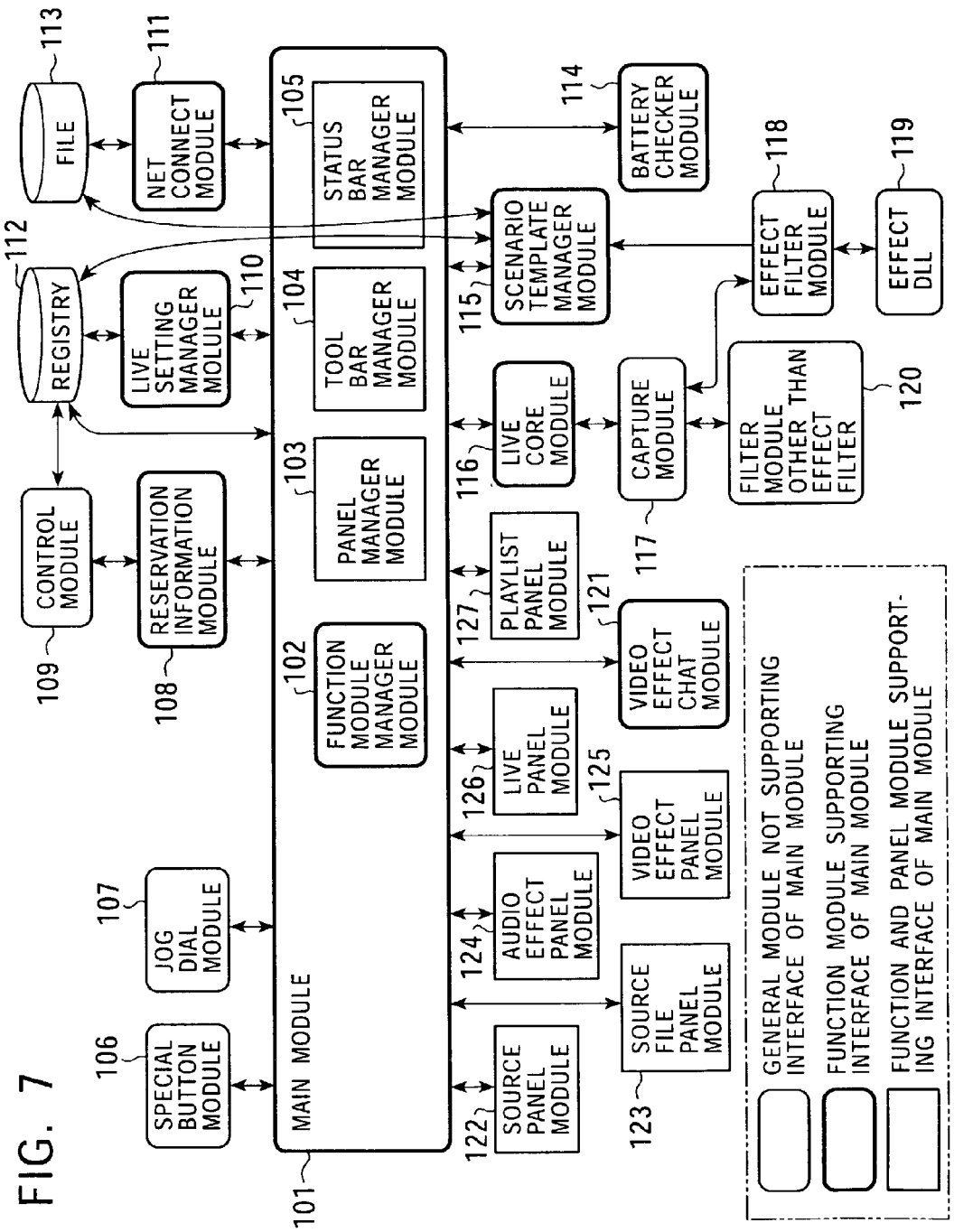
FIG. 7 is a diagram showing the configuration of a live distribution application program loaded in the user terminal.

The above-described user terminal 10 records, as shown in FIG. 7, a live distribution application program formed by a plurality of modules including function modules (described below) in the hard disk. Live distribution of the content is performed by executing, by the CPU 51, the live distribution application program. The live distribution application program can be provided by a predetermined recording medium such as a compact disc (CD) or a digital versatile disk (DVD) or by a transmission medium such as the Internet.

The live distribution application program includes, schematically, various function modules which are feature expansion plug-in modules providing an interface defined on a main module 101, which is a higher management module functioning as the basis of the live distribution application program, and various general modules which do not support the interface defined on the main module 101 and which handle various pieces of hardware.

The function modules are classified broadly into panel modules having predetermined graphical user interfaces, that is, the above-described panel windows, and modules which do not have a graphical user interface. Each of the panel modules with the graphical user interface has a window managed by the main module 101. By displaying the window on the display unit 55, the graphical user interface can be provided to the user. In contrast, the modules which have no graphical user interface do not have a window managed by the main module 101. These modules mainly offer functions to other modules. These modules which have no graphical user interface may present various statuses on the main module 101.

Referring to FIG. 7, rectangles with rounded angles represent the general modules which do not support the interface defined on the main module 101; shaded rectangles with rounded angles represent the function modules which support the interface defined on the main module 101; and shaded rectangles represent the function and panel modules which support the interface defined on the main module 101.

Specifically, in the live distribution application program, the general modules include a special button module 106, a jog dial module 107, a control module 109, a capture module 117, an effect filter module 118, an effect dynamic link library (DLL) 119, and a filter module 120 other than the effect module. The function modules include a function module manager module 102, a reservation information module 108, a live setup manager module 110, a net connect module 111, a battery checker module 110, a scenario template manager module 115, a live core module 116, and a video effect chat module 121. The function and panel modules include a panel manager module 103, a tool bar manager module 104, a status bar manager module 105, a source panel module 122, a source file panel module 123, an audio effect panel module 124, a video effect panel module 125, a live panel module 126, and a playlist panel module 127.

In the live distribution application program, the special button module 106 and the jog dial module 107 are formed as input modules. The reservation information module 108, the control module 109, the live setting module 110, the net connect module 111, a registry 112, and a file 113 are formed as reservation modules. The live core module 116 and the capture module 117 are formed as live modules. The effect filter module 118, the effect DLL 119, and the filter module 120 other than the effect filter are formed as effect modules.

The main module 101 is an execution module which is the basis of the live distribution application program. The main module 101 manages a plurality of function modules. In the live distribution application program, all the modules are expanded on the main module 101. The main module 101 operates these various expanded modules as multithreaded modules. The main module 101 also processes specially provided hardware such as a special button and hardware such as a jog dial. The main module 101 also manages communication among a plurality of function modules and manages a plurality of panel modules.

Specifically, the main module 101 creates a main window to be displayed on the display unit 55 when the CPU 51 executes the live distribution application program. In the live distribution application program, this main window exists as a unique parent window, and each panel window exists as a child window associated with the main window. In the live distribution application program, there are various messages that are only transmitted from the operating system to the main window. If various function modules require these messages, the main module 101 relays these messages.

In the main module 101, the function module manager module 102, the panel manager module 103, the tool bar manager module 104, and the status bar manager module 105 are incorporated as manager modules. In the live distribution application program, the main module 101 only creates and provides the main window. Management of various function modules and panel windows is performed by various manager modules. Thus, the main module 101 kicks each manager module.

The function module manager module 102, which is one of the manager modules, reads each function module allocation information from the registry 112. In other words, the function module manager module 102 obtains a list of function modules to be read by the main module 101. The allocation information includes information concerning the graphical user interface of each function module and module priority level.

The function module manager module 102 initializes each function module. Specifically, the function module manager module 102 reads and initializes each function module on the basis of each function module allocation information read from the registry 112. When the function module manager module 102 completes reading each function module, the function module manager module 102 sends a message indicating completion to each function module. After receiving the message, each function module can be initialized, which is accompanied by inter-module communication. When each function module completes initialization processing accompanied by inter-module communication, each function module sends a message indicating completion to the main module 101 via the function module manager module 102. When the function module manager module 102 receives messages from all the function modules, the function module manager module 102 sends a message indicating that initialization of each function module is completed to each function module.

The function module manager module 102 performs relaying operations for inter-module communication. Specifically, in the live distribution application program, all the modules communicate with one another via the function module manager module 102. In order to perform inter-module communication, each function module sends a request to the main module 101 via the function module manager module 102. At this time, each function module transfers information indicating the destination function module and bulk data to the main module 101 via the function module manager module 102. In response to the request, the main module 101 performs a relaying operation to the destination function module via the function module manager module 102.

The panel manager module 103, which is one of the manager modules, reads panel window allocation information from the registry 112 and associates each module with a corresponding panel window. This operation will be described below.

The tool bar manager module 104, which is one of the manager modules, reads tool bar information concerning a tool bar to be displayed on the display unit 55 from the registry 112 and displays the tool bar on the display unit 55.

The status bar manager module 105, which is one of the manager modules, allocates a status bar area, which is an area for displaying various statuses on the display unit 55. Specifically, the status bar manager module 105 allocates a status bar to a function module that has requested a status bar to be allocated. The status bar manager module 105 receives a bitmap or a character string from a module that needs to display a status on the display unit 55, and the status is displayed on the status bar.

The main module 101 into which various manager modules are incorporated creates the main module and manages various function modules.

The special button module 106 controls the special button, which is the specially provided hardware, and sends a hardware event to the application side. The application side can always detect the status of the special button via the special button module 106. Specifically, the special button module special button module 106 initializes the special button. Also, the special button module 106 allocates a message indicating a user operation relative to the special button to an active module. Also, the special button module 106 manages information to be displayed on the display unit 55 as a description of the special button from each module and displays a description for the active module in a special button description display area which is an area for displaying the description on the display unit 55. Also, the special button module 106 monitors the inverted state of the display unit 55 and changes the window mode in accordance with the monitoring result.

The jog dial module 107 controls the jog dial (not shown). At any time, the application side can access the jog dial function via the jog dial module 107. Specifically, the jog dial module 107 initializes the jog dial. Also, the jog dial module 107 distributes a message indicating a user operation relative to the jog dial to the active module. Also, the jog dial module 107 manages information to be displayed on the display unit 55 as information concerning the jog dial from each module and displays a description for the active module on a jog dial description display area, which is an area for displaying the description on the display unit 55.

The reservation information module 108 manages the above-described reservation information. In the live distribution application program, when live distribution is reserved, reservation information is encrypted and the encrypted reservation information is recorded in the registry 112. The reservation information module 108 monitors the registry 112 and obtains the reservation information recorded in the registry 112 using the control module 109 described below. The reservation information module 108 performs lexical analysis of the value of the reservation information and provides meaningful information, rather than a character string, to each module.

The control module 109 is an Active X control for accessing the reservation information recorded in the registry 112. The control module 109 reads the reservation information from the registry 112 and supplies the reservation information to the reservation information module 108.

The live setting module 110 manages information concerning live distribution and displays a dialog for various setup procedures on the display unit 55. In the live distribution application program, all pieces of information that have been setup are recorded in the registry 112. Each module that requires the set information obtains the set information via the live setting module 110.

The net connect module 111 performs various control operations such as monitoring the connection status to a network including the Internet 2, obtains the status of radio waves when the user terminal 10 connects to the Internet using the above-described PHS, and requests the above-described status bar to display the status of radio waves. The net connect module 111 does not have a graphical user interface. The net connect module 111 supplies a bitmap indicating the radio wave status of the PHS and a character string indicating the status of the network to the status bar manager module 105 incorporated in the main module 101.

The battery checker module 114 obtains the status of the remaining amount of a battery (not shown) attached to the user terminal 10 and requests the above-described status bar to display the status of the remaining amount. When no battery is attached to the user terminal 10, the battery checker module 114 assumes that there is no status of the remaining amount. The battery checker module 114 does not have a graphical user interface. The battery checker module 114 supplies a bitmap indicating the status of the remaining amount of the battery to the status bar manager module 105 incorporated in the main module 101.

The scenario template manager module 115 manages a program scenario template for performing live distribution. The scenario template includes a file list, which is a list of video and/or audio files recorded in the file 113 selectable as an input source for performing live distribution; a video effect list, which is a list of video effects which can be enabled when live distribution is performed and which are supplied from the effect filter module 118 described below; and an audio effect list, which is a list of audio effects which can be enabled when live distribution is performed and which are supplied from the effect filter module 118. The scenario template manager module 115 manages each list constituting the scenario template. The scenario template manager module 115 supplies the file list via the main module 101 to the source file panel module 123 described below, the video effect list via the main module 101 to the video effect panel module 125 described below, and the audio effect list via the main module 101 to the audio effect panel module 124 described below.

The live core module 116 is a function module concerning live distribution. The live core module 116 manages the capture module 117 described below. A module that uses the capture module 117 issues a control command to the live core module 116 in accordance with the intended use, such as adding a source, adding an effect, or controlling starting and ending of live distribution.

The capture module 117 is an application program implementing mode for using the digital video camera 60. The capture module 117 does not have a graphical user interface. The capture module 117 can paste a finder screen of the digital video camera 60 onto the display unit 55. Also, the capture module 117 has a function for constructing a designated filter graph when a filter is registered.

The effect filter module 118 is a filter for adding various effects to input image and/or audio data from the digital video camera 60 and a microphone (not shown). In the live distribution application program, modules that actually give effects are all DLLized. The effect filter module 118 has a function for reading the effect DLL 119 installed in a predetermined folder and changing from one effect to another. The live distribution application program has the filter module 120 other than the effect filter.

The effect DLL 119 is a module for giving an effect to image and/or audio data.

The video effect chat module 121 provides a function for communicating with a chat application program for enabling the client terminals $20_1$, $20_2$, $20_3$, ... to chat with one another, that is, two-way communication, and to the live distribution application program, and reflecting an effect by the chat application program in the live distribution application program. Specifically, in the personal broadcasting system 1, when the user terminal 10 executes the live distribution application program while the user terminal 10 and the client terminals $20_1$, $20_2$, $20_3$, ... execute the chat application program, content can be distributed live, and simultaneously the user, who will be the distributor, and the client, who will be the viewer/listener, can chat with each other while the user's and the client's video data are displayed on their display screens. In other words, the personal broadcasting system 1 can implement the viewer/listener-participating-type personal casting service since the video effect chat module 121 is added to the live distribution application program executed by the user terminal 10.

The source panel module 122 provides a panel window for previewing, through the display unit 55, video and/or audio data which is captured by the digital video camera 60 and which can be used as an input source. In addition to the previewing function, the source panel module 122 provides a graphical user interface such as a button for setting up the digital video camera 60.

The source file panel module 123 provides a panel window for previewing, through the display unit 55, a moving image file registered in the file list managed by the above-described scenario template manager module 115. In addition to the previewing function, the source file panel module 123 provides a graphical user interface for selecting and setting up the file list.

The audio effect panel module 124 provides a panel window for listening to the audio effect list managed by the above-described scenario template manager module 115. In addition to the listening function, the audio effect panel module 124 provides a graphical user interface for selecting and setting up the audio effect list.

The video effect panel module 125 provides a panel window for previewing the video effect list managed by the above-described scenario template manager module 115. In addition to the previewing function, the video effect panel module 125 provides a graphical user interface for selecting a video effect from the video effect list and setting up the effect template.

The live panel module 126 provides a panel window for monitoring video and/or audio data to be distributed. In addition to the monitoring function, the live panel module 126 provides a graphical user interface for starting and ending live distribution and setting the master volume.

The playlist panel module 127 provides a panel window for displaying a distribution log and reservation information on the display unit 55. Specifically, in the live distribution application program, distributed content can be recorded in the hard disk or the like. As described below, the playlist panel module 127 can display the distribution log and reservation information on the display unit 55 so that the content can be seen in the form of an album.

Accordingly, the live distribution application program is formed by a plurality of modules including the function modules and performs live distribution of the content.

Although not shown in the drawing, the live distribution application program can have another module, such as a hard disk checker module for obtaining the status of the remaining capacity of the hard disk and requesting the status bar to display the status of the remaining capacity. By adding a panel module in accordance with another function to the live distribution application program, the number of panel windows displayed on the display unit 55 can be increased. In other words, each panel module is provided for each panel window described below.

The user terminal 10 having installed therein the live distribution application program formed by these various modules has a multi-window function for simultaneously displaying a plurality of independent windows on the display screen. When the live distribution application program is executed, if live distribution is being performed, the display unit 55 displays a window with a predetermined configuration as a graphical user interface. The user terminal 10 offers the following functions as graphical user interfaces: displaying the above-described main window; displaying and switching between a plurality of panel windows forming a window as a main screen corresponding to each function module and a panel window as a setup screen; displaying a guidance bar, which is a guidance member (described below) including a group of buttons for activating predetermined guides; displaying the status bar for displaying various statuses; and displaying a guidance window (described below).

Figure 8:
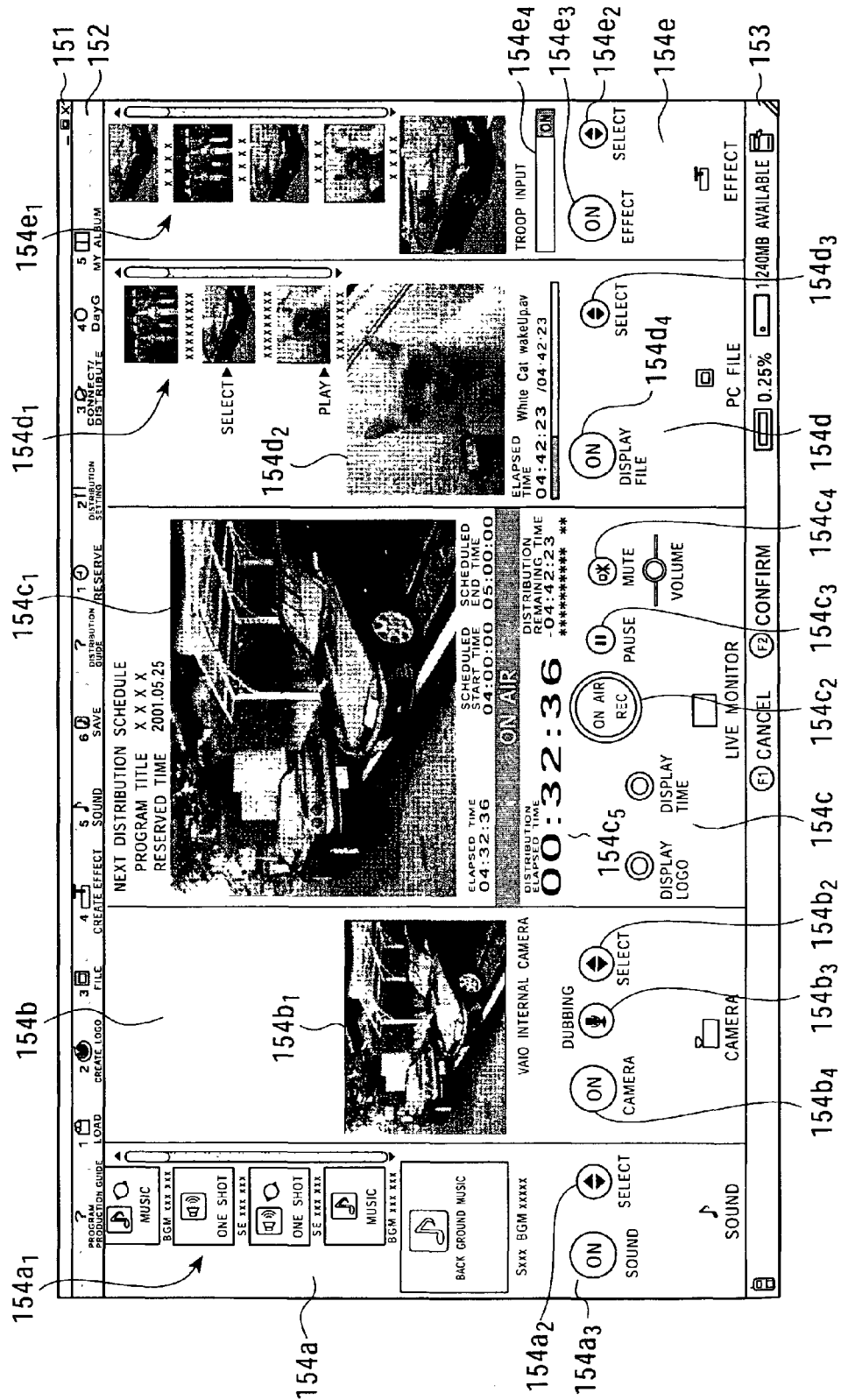
FIG. 8 is an illustration of a distributing layout of windows displayed on the display unit, in which the details of the windows are shown.

Specifically, the user terminal 10 displays a window such as that shown in FIG. 8 on the display unit 55. This window includes a main window 151 created by the above-described main module 101; on the main window 151, a guidance bar 152 created by each manager module incorporated in the main module 101; a status bar 153 created by each manager module incorporated in the main module 101; and a plurality of panel windows 154a, 154b, 154c, 154d, and 154e created by function modules. In this window, the guidance bar 152, which is a horizontal strip, is disposed at the top thereof, and the status bar 153, which is a horizontal strip, is disposed at the bottom thereof. Between the guidance bar 152 and the status bar 153, which are disposed at the top and bottom of the window, the plurality of panel windows 154a, 154b, 154c, 154d, and 154e, which are vertically-divided windows in accordance with the corresponding functions, are displayed side-by-side on the display unit 55. Hereinafter this screen arrangement is referred to as a distributing layout. The panel windows 154a, 154b, 154c, 154d, and 154e are each implemented as an independent window.

Referring to FIG. 8, the displayed panel windows include the sound panel window 154a for performing operations related to sound; the camera input panel window 154b for performing operations related to video data which is selectable as an input source and which is captured by the digital video camera 60; the main monitor panel window 154c for performing operations related to live-distributed video and/or audio data; the file input panel window 154d for performing operations related to video data which is selectable as an input source and which is recorded in the hard disk; and the effect panel window 154e for performing operations related to effects.

The guidance bar 152 provides two types of guides, namely, two guide buttons for activating a program production guide and a distribution guide (described below) and a plurality of direct buttons for directly activating corresponding functions. The guidance bar 152 will be described below in detail.

The status bar 153 provides areas for displaying the status of radio waves when the user terminal 10 connects to the Internet 2 using the above-described PHS, the connection status when the user terminal 2 establishes the above-described PPP connection, the status of the remaining amount of the battery, and the status of the remaining capacity of the hard disk.

The sound panel window 154a provides a plurality of icons $154a_1$ for indicating a list of audio data, such as registered wav files to be transmitted as background music when live distribution is performed; a button $154a_2$ for selecting a desired icon from among the plurality of icons $154a_1$; and a button $154a_3$ for playing or stopping audio data corresponding to the selected icon. As described below, the sound panel window 154a shares part of a panel window (not shown) serving as a setup screen. The sound panel window 154a is constructed as a subset of the panel window serving as the setup screen. The panel window serving as the setup screen provides a button for adding selected audio data to the list, a button for deleting audio data from the list, and a button for deleting all audio data from the list.

The camera input panel window 154b provides a preview area $154b_1$ for displaying a preview image for previewing video data which is selectable as an input source and which is captured by the digital video camera 60; a button $154b_2$ for setting the input source to the video data captured by the digital video camera 60; a button $154b_3$ for dubbing video data which is selectable as an input source and which is recorded in the hard disk using audio data captured by the digital video camera 60; and a button $154b_4$ for activating an application program for setting up the digital video camera 60.

The main monitor panel window 154c provides a preview area $154c_1$ for previewing video and/or audio data to be distributed live; a button $154c_2$ for starting or stopping test capturing and actual distribution; a button $154c_3$ for pausing video and/or audio data; a button $154c_4$ for muting audio data; and a time display area $154c_5$ for displaying the distribution elapsed time and the remaining time.

The file input panel window 154d provides a thumbnail area $154d_1$ for displaying thumbnail images for indicating lists of video data which are selectable as input sources and which are recorded in the hard disk; a preview area $154d_2$ for displaying a preview image for previewing video data; a button $154d_3$ for selecting one from among the thumbnail images serving as the lists; and a button $154d_4$ for playing or stopping video data corresponding to the selected thumbnail image. As described below, the file input panel window 154d shares part of a panel window (not shown) serving as a setup screen and is formed as a subset of the panel window serving as the setup screen.

The effect panel window 154e provides a thumbnail area $154e_1$ for displaying thumbnail images for indicating lists of various effect materials to be added to live-distributed video and/or audio data; a button $154e_2$ for selecting one from among the thumbnail images; a button $154e_3$ for executing or canceling an effect corresponding to the selected thumbnail image; and a box $154e_4$ for entering a character string to be superimposed in real time as an effect. As described below, the effect panel window 154e shares part of a panel window (not shown) serving as a setup screen and is formed as a subset of the panel window serving as the setup screen. The panel window serving as the setup screen provides a button for adding an effect material to the list, a button for deleting an effect material from the list, and a button for deleting all effect materials from the list.

In order to represent each function's share, the user terminal 10 displays separate elements generated by vertically dividing the window serving as the main screen into units of functions as the panel windows 154a, 154b, 154c, 154d, and 154e corresponding to the functions on the display unit 55. Accordingly, the user can immediately and easily understand the association between the operation for each function and a group of necessary buttons. For example, when the user wants to add an effect, the user is only required to pay attention to the effect panel window 154e.

Some of the panel windows 154a, 154b, 154c, 154d, and 154e include items that need to be setup by the user. These panel windows share part of corresponding panel windows serving as setup screens for performing setup and are formed as subsets of these panel windows serving as the setup screens. Specifically, in the user terminal 10, among the panel windows 154a, 154b, 154c, 154d, and 154e, the sound panel window 154a, the file input panel window 154d, and the effect panel window 154e have corresponding panel windows serving as setup screens. In order to clarify the relationship between the sound panel window 154a, the file input panel window 154d, and the effect panel window 154e forming the window serving as the main screen and the corresponding panel windows serving as the setup screens, the user terminal 10 horizontally contracts and minimizes, among the panel windows 154a, 154b, 154c, 154d, and 154e, panel windows which are not to be setup as strips and moves the minimized panel windows towards both edges of the display screen. At the same time, the user terminal 10 horizontally expands a panel window to be setup on the display screen, moves the expanded panel window toward the center of the display screen, and displays the panel window on the display unit 55 so that a necessary area serving as a setup screen can be viewed. Hereinafter this type of screen arrangement is referred to as a setup layout.

Figure 9:
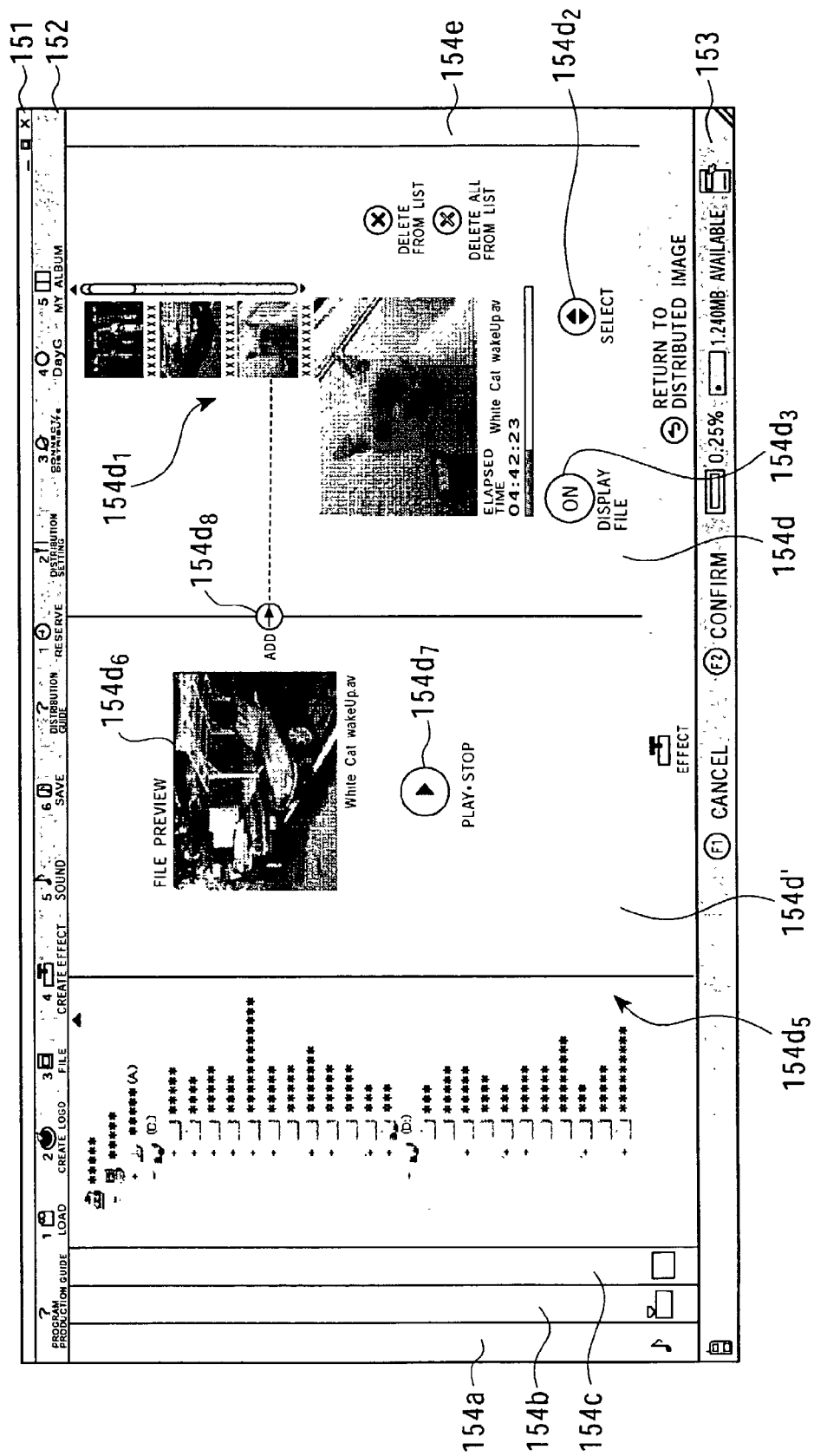
FIG. 9 is an illustration of a setup layout of windows displayed on the display unit, in which the details of the windows are shown.

For example, when performing an operation related to video data which is selectable as an input source and which is recorded in the hard disk, as shown in FIG. 9, the user terminal 10 minimizes the sound panel window 154a, the camera input panel window 154b, the main monitor panel window 154c, and the effect panel window 154e and moves the minimized panel windows towards both ends of the display screen. At the same time, the user terminal 10 horizontally expands the file input panel window 154d on the display screen and moves the file input panel window 154d so that a panel window 154d' for setting up the file input panel window 154d can be exposed (brought to the foreground). Thus, the file input panel window 154d and the panel window 154d' are displayed on the display unit 55.

The newly exposed panel window 154d' provides a browser area $154d_5$ for selecting a material for registering, in a list, video data which is selectable as an input source and which is recorded in the hard disk; a preview area $154d_6$ for displaying a preview image for previewing the selected video data; a button $154d_7$ for playing or stopping video data corresponding to the selected preview image; and a button $154d_8$ for adding the selected video data to the list.

Accordingly, the user terminal 10 displays the panel window 154d' serving as the setup screen on the display unit 55. The user can search for desired video data and adds the detected video data as an input source. The added video data is additionally displayed as a thumbnail image in the thumbnail area $154d_1$ in the file input panel window 154d forming the window serving as the main screen.

The opening/closing operations of the panel windows 154a, 154b, 154c, 154d, and 154e in transition from the distributing layout to the setup layout and vice versa on the display screen are performed on the basis of the following rules.

Specifically, the user terminal 10 horizontally minimizes panel windows other than that to be setup. In the minimized panel windows, only icons indicating the types of panel windows are displayed. Various buttons provided inside the minimized panel windows are hidden. The user terminal 10 displays minimization of the panel windows and restoration of the panel windows (changing the minimized panel windows back to normal size) using animation. An icon which is displayed in each panel window and which indicates the type thereof includes animation of closing/opening of the panel window and is always displayed at the horizontal center of the panel window.

FIGS. 10 to 14 show the specific operation of the panel windows 154a, 154b, 154c, 154d, and 154e, which are opened/closed in accordance with the above-described rules. A case will now be described in which, among the panel windows 154a, 154b, 154c, 154d, and 154e, the file input panel window 154d is to be setup. In FIGS. 10 to 14, circles indicated at the bottom of the panel windows 154a, 154b, 154c, 154d, and 154e are icons indicating the types of panel windows.

Figure 10:
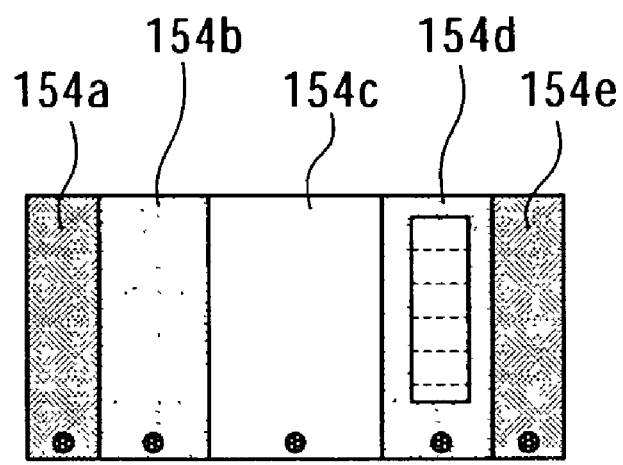
FIG. 10 is an illustration of opening and closing operations of panel windows in the distributing layout as the initial state.
Figure 11:
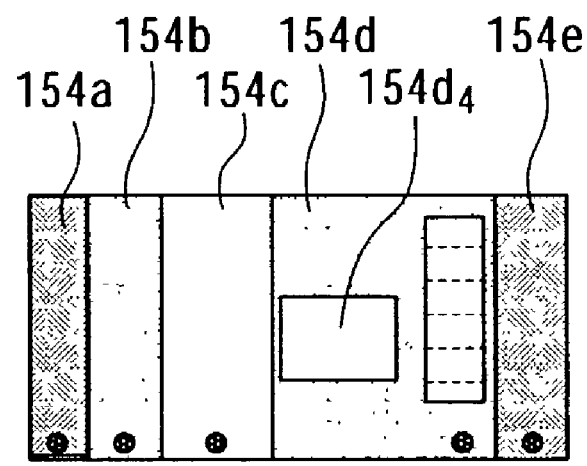
FIG. 11 is an illustration of opening and closing operations of the panel windows in transition from the distributing layout to the setup layout.

In the user terminal 10, as shown in FIG. 10, the initial state of the display screen is the distributing layout. The display screen starts sliding. As shown in FIG. 11, the panel windows 154a, 154b, 154c, and 154e, which are not to be setup, slide towards both ends of the display screen while horizontally being contracted on the display screen. In response to this, the user terminal 10 horizontally expands the file input panel window 154d, which is to be setup, on the display screen, and hence the contents of the panel window 154d' serving as the above-described setup screen can be seen. At this time, in the user terminal 10, the effect panel window 154e, which is disposed on the right of the file input panel window 154d, slides to the right end of the display screen. In response to this, the file input panel window 154d also slides rightward on the display screen.

Figure 12:
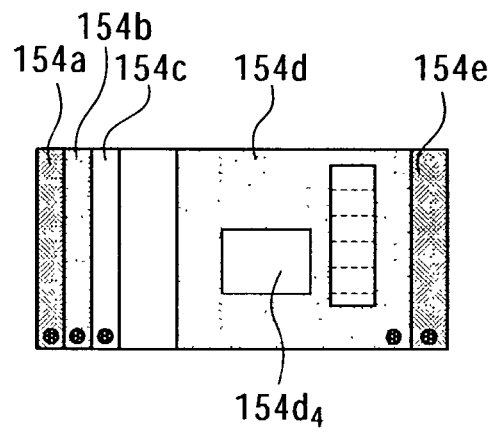
FIG. 12 is an illustration of opening and closing operations of the panel windows having completed transition from the distributing layout to the setup layout.

In the user terminal 10, as shown in FIG. 12, the panel windows 154a, 154b, 154c, and 154e, which are not to be setup, are reduced in size and moved towards both ends of the display screen, and the file input panel window 154d, which is to be setup, is maximized. Then, the sliding operation is terminated, thus allowing the user to perform setup of the file input panel window 154d. In the user terminal 10, various items in the panel windows 154a, 154b, 154c, and 154e, which are not to be setup, are hidden.

Figure 13:
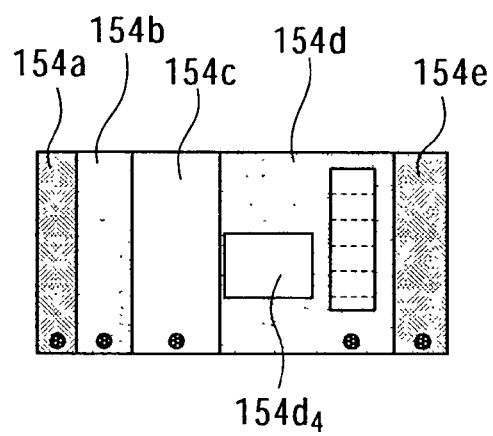
FIG. 13 is an illustration of opening and closing operations of the panel windows in transition from the setup layout to the distributing layout.

Subsequently, in the user terminal 10, when the setup procedure by the user in the setup layout shown in FIG. 12 is completed, the sliding operation starts again. In the user terminal 10, as shown in FIG. 13, the panel windows 154a, 154b, 154c, and 154e, which are not to be setup, slide towards the center of the display screen while being horizontally expanded on the display screen. In response to this, in the user terminal 10, the file input panel window 154d, which has been setup, is horizontally contracted on the display screen, and the contents of the panel window 154d' serving as the above-described setup screen gradually becomes hidden. At this time, in the user terminal 10, the effect panel window 154e, which is disposed on the right of the file input panel window 154d, slides to the left of the display screen. In response to this, the file input panel window 154d also slides leftward on the display screen.

Figure 14:
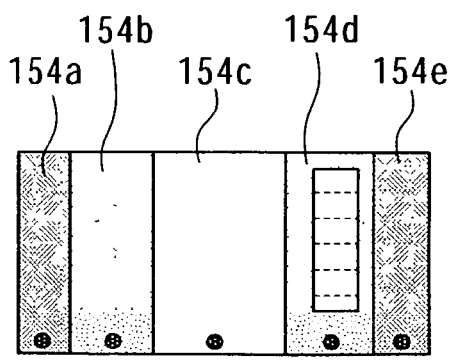
FIG. 14 is an illustration of opening and closing operations of the panel windows having completed transition from the setup layout to the distributing layout.

In the user terminal 10, as shown in FIG. 14, the panel windows 154a, 154b, 154c, and 154e, which are not to be setup, are restored at predetermined positions on the display screen, and the file input panel window 154d, which has been setup, is also restored. Then, the sliding operation is terminated, and the display screen changes to the distributing layout. At this time, in the user terminal 10, various hidden items in the panel windows 154a, 154b, 154c, and 154e, which are not to be setup, are displayed.

In the user terminal 10 for closing and opening the panel windows in the foregoing manner, each panel window, which is an independent window, is implemented in accordance with each independent panel module in the above-described live distribution application program. By executing, by the user terminal 10, the live distribution application program, the user terminal 10 can resize each panel window and changes the position of each panel window in accordance with the opening/closing operation.

Specifically, the user terminal 10 issues a control command to each panel module using the above-described main module 101 in the live distribution application program and the panel manager module 103 incorporated in the main module 101. Also, the user terminal 10 manages arrangement information for each panel window, that is, positional information on the display screen, and displays a plurality of panel windows as a single interlocking application window on the display unit 55. Since the user terminal 10 uses the panel manager module 103 to determine the position and the size of each panel window on the display screen, the user terminal 10 reads a layout defining file, which is layout information, in accordance with the size of the current display screen, which serves as the above-described arrangement information, from the registry 112 and disposes each panel window in accordance with coordinate information indicated in the layout defining file.

Figure 15:
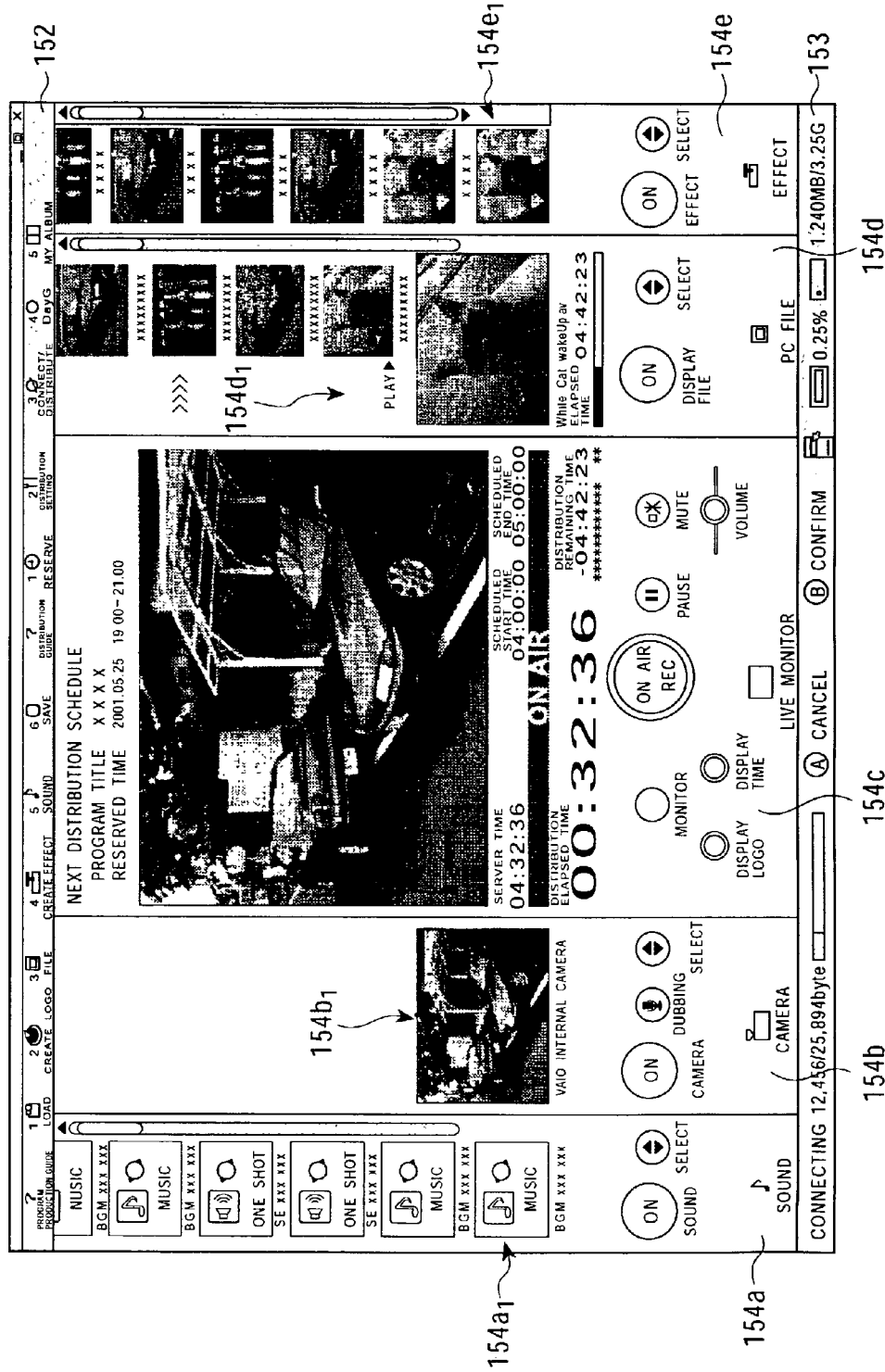
FIG. 15 is an illustration of the distributing layout of windows displayed on the display unit, in which the details of the windows are shown, when the size of the display screen is small.

For example, when the size of the display screen is small, as shown in FIG. 15, the user terminal 10 minimizes the icon $154a_1$, the preview areas $154b_1$ and $154b_2$, and the thumbnail areas $154d_1$ and $154e_1$, compared with those shown in FIG. 8, and minimizes the overall main screen. The user terminal 10 performs such processing based on the layout defining file, which is read by the panel manager module 103 from the registry 112.

Figure 16:
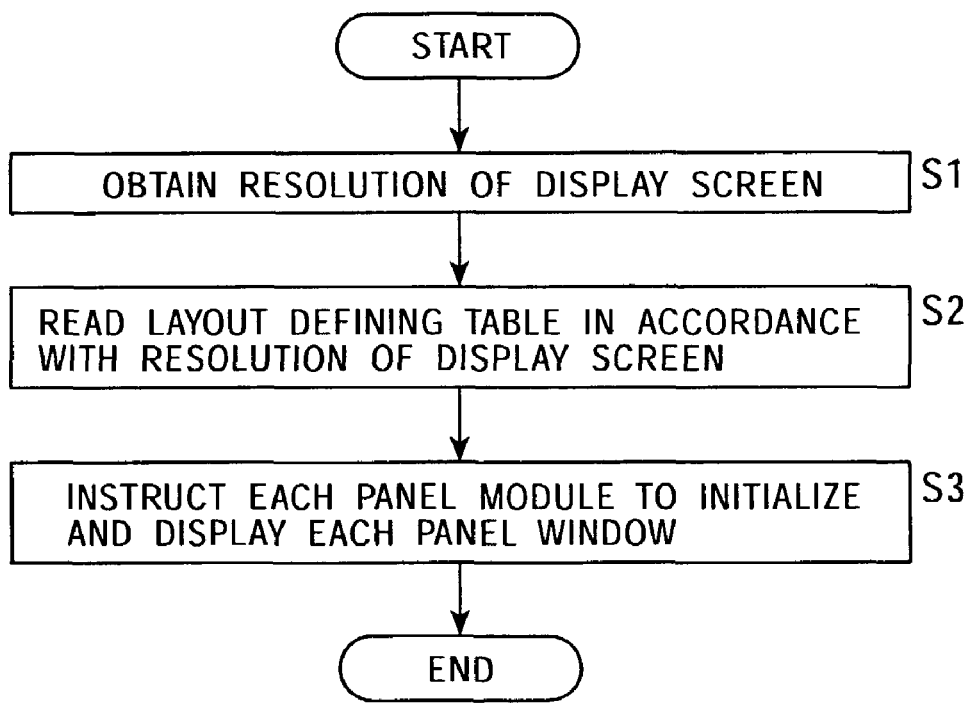
FIG. 16 is a flowchart showing a process of activating, by the user terminal, the live distribution application program and initializing and displaying each panel window.
Figure 17:
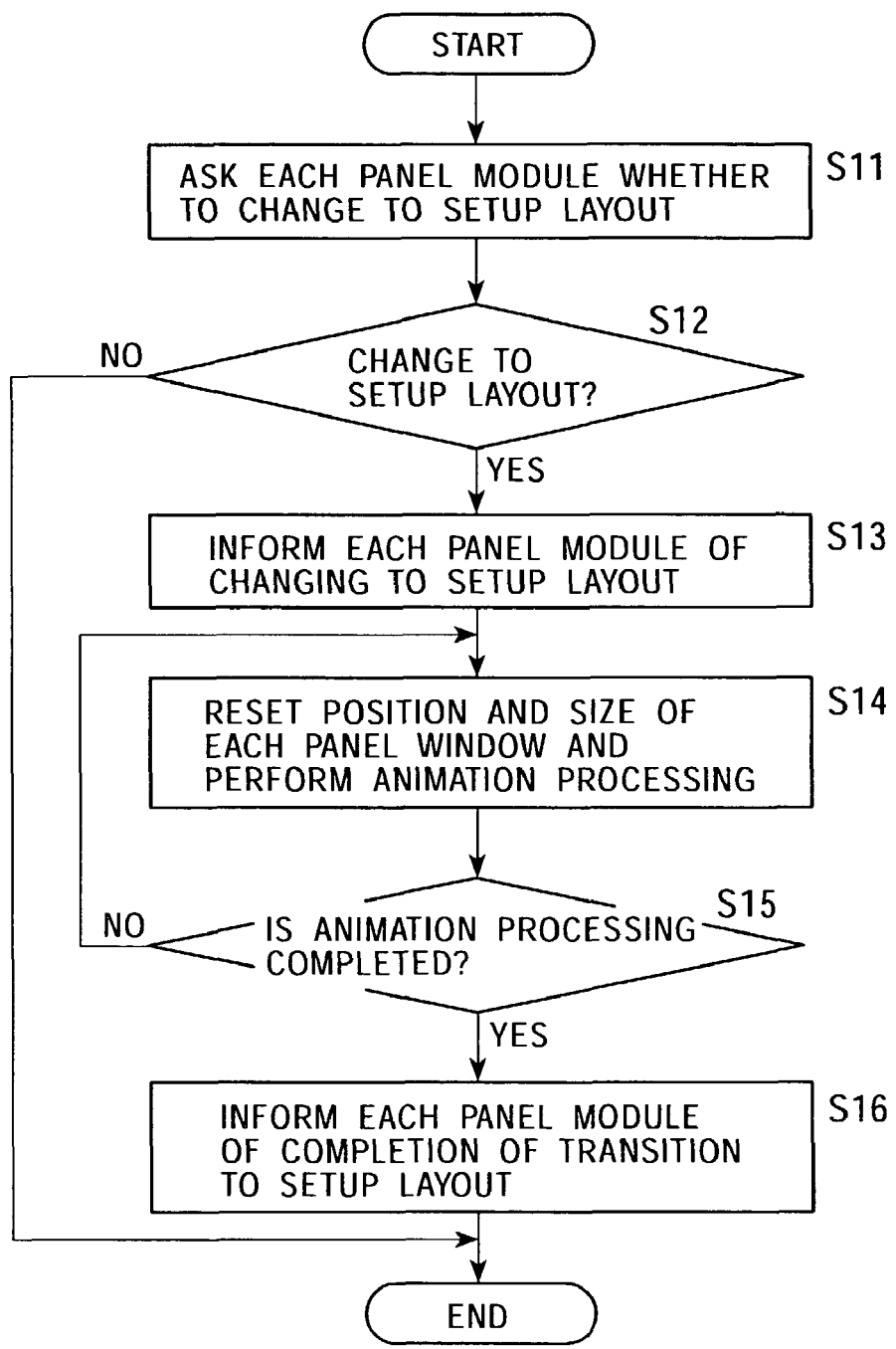
FIG. 17 is a flowchart showing a process performed by the user terminal in transition from the distributing layout to the setup layout.
Figure 18:
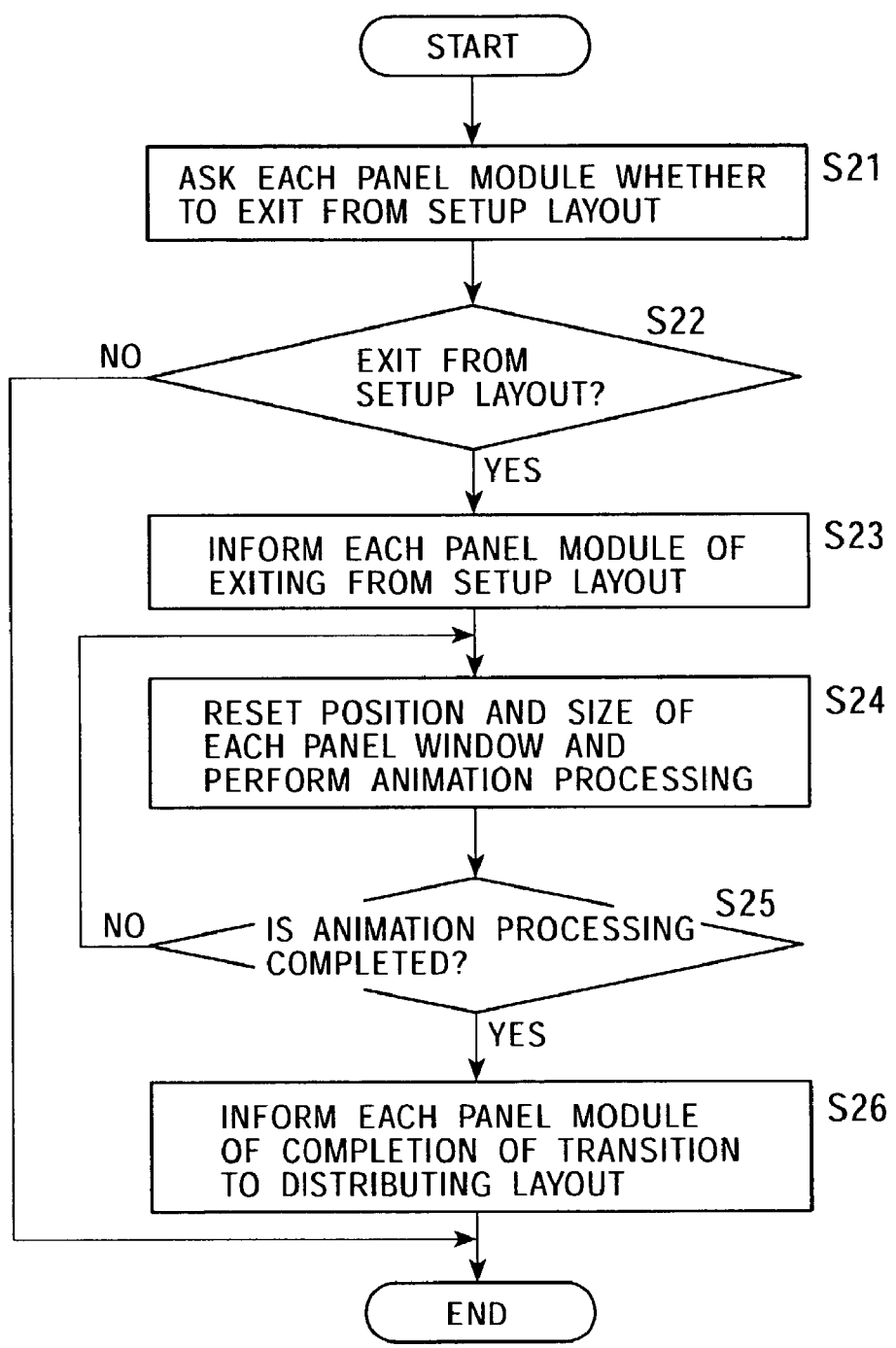
FIG. 18 is a flowchart showing a process performed by the user terminal in transition from the setup layout to the distributing layout.

Specifically, the user terminal 10 executes the live distribution application program and performs a series of processes shown in FIGS. 16 to 18, thus opening and closing each panel window.

When the user terminal 10 activates the live distribution application program, the user terminal 10 performs the process shown in FIG. 16.

Specifically, referring to FIG. 16, in step S1, the user terminal 10 uses the panel manager module 103 to obtain information indicating the size of the display screen, that is the resolution of the display screen.

In step S2, the user terminal 10 uses the panel manager module 103 to read a layout defining file from the registry 112 in accordance with the resolution of the display screen.

In step S3, the user terminal 10 uses the panel manager module 103 to instruct each panel module to initialize and display each panel window. Then, the process is terminated.

Accordingly, when the user terminal 10 activates the live distribution application program, the user terminal 10 initializes and displays each panel window under the control of the panel manager module 103.

When changing from the distributing layout to the setup layout, the user terminal 10 performs the process shown in FIG. 17.

Referring to FIG. 17, in step S11, the user terminal 10 uses the main module 101 to ask each panel module whether or not it is allowed to change to the setup layout.

If it is determined in step S12 that the distributing layout cannot be changed to the setup layout, the user terminal 10 terminates the process.

In contrast, if it is determined in step S12 that the distributing layout can be changed to the setup layout, in step S13, the user terminal 10 uses the main module 101 to inform each panel module of the fact that the distributing layout is to be changed to the setup layout.

In step S14, the user terminal 10 under the control of the main module 101 resets the position and the size of each panel window on the display screen and displays animation.

In step S15, the user terminal 10 under the control of the main module 101 determines whether or not animation has been completed.

If it is determined that the animation has not been completed yet, the user terminal 10 repeats processing from step S14 onward.

In contrast, if it is determined that the animation has been completed, in step S16, the user terminal 10 uses the main module 101 to inform each panel module of the fact that the transition to the setup layout has been completed. Then, the process is terminated.

By performing this process, the user terminal 10 can change the display screen from the distributing layout to the setup layout.

When changing from the setup layout to the distributing layout, the user terminal 10 performs the process shown in FIG. 18.

Referring to FIG. 18, in step S21, the user terminal 10 uses the main module 101 to ask each panel module whether or not it is allowed to exit from the setup layout and change to the distributing layout.

If it is determined in step S22 that it is not allowed to exit from the setup layout, the user terminal 10 terminates the process.

In contrast, if it is determined in step S22 that it is allowed to exit from the setup layout, in step S23, the user terminal 10 uses the main module 101 to inform each panel module of exiting from the setup layout.

In step S24, the user terminal 10 under the control of the main module 101 resets the position and the size of each panel window on the display screen and displays animation.

In step S25, the user terminal 10 under the control of the main module 101 determines whether or not the animation has been completed.

If it is determined that the animation has not been completed yet, the user terminal 10 repeats processing from step S24 onward.

In contrast, if it is determined that the animation has been completed, in step S26, the user terminal 10 uses the main module 101 to inform each panel module of the fact that the transition from the setup layout to the distributing layout is completed. Then, the process is terminated.

By performing this process, the user terminal 10 can change the display screen from the setup layout to the distributing layout.

Accordingly, the user terminal 10 seamlessly changes between the panel windows forming the window serving as the main screen and the panel window serving as the setup screen, and the functions are grouped into units of panel windows. Thus, the panel windows forming the window serving as the main screen can be displayed in the same display manner as the panel window serving as the setup screen on the display unit 55. As a result, the association between the main screen and the setup screen can be clarified, and a highly-entertaining and easy-to-understand graphical user interface can be provided for the user. In the setup layout, the user terminal 10 causes various items in the panel windows which are not to be setup to be hidden. Thus, the number of unnecessary items is not increased, and mistakes in user operations and confusions can be suppressed.

Since the user terminal 10 controls each panel window using each panel module and the main module 101 for controlling the layout, the user terminal 10 can provide a flexible layout in accordance with the size of the display screen. By adding a panel module corresponding to a function and a layout defining file to the user terminal 10, the user terminal 10 can easily increase the number of panel windows displayed on the display unit 55.

A guide function of the user terminal 10 will now be described.

The user terminal 10 has a predetermined guide function for offering a guide that assists a user to understand the functions of the live distribution application program. Thus, a novice user who must perform complicated operations can be easily provided with a personal casting service. Also, regardless of the level of experience, a user who wants to learn the operation procedures and the details of the operations can obtain sufficient help.

Schematically, the guide function assigns numbers to corresponding functions prepared by the live distribution application program and represents the functions as buttons. These buttons are grouped and displayed on the display unit 55. When the user uses a mouse to press these buttons, corresponding procedures are displayed, and the user can perform operations in accordance with the displayed procedures. Accordingly, the user can be automatically provided with necessary functions. With the guide function, when a button is pressed using the mouse, a corresponding guide description is displayed on the display unit 55.

Figure 19:
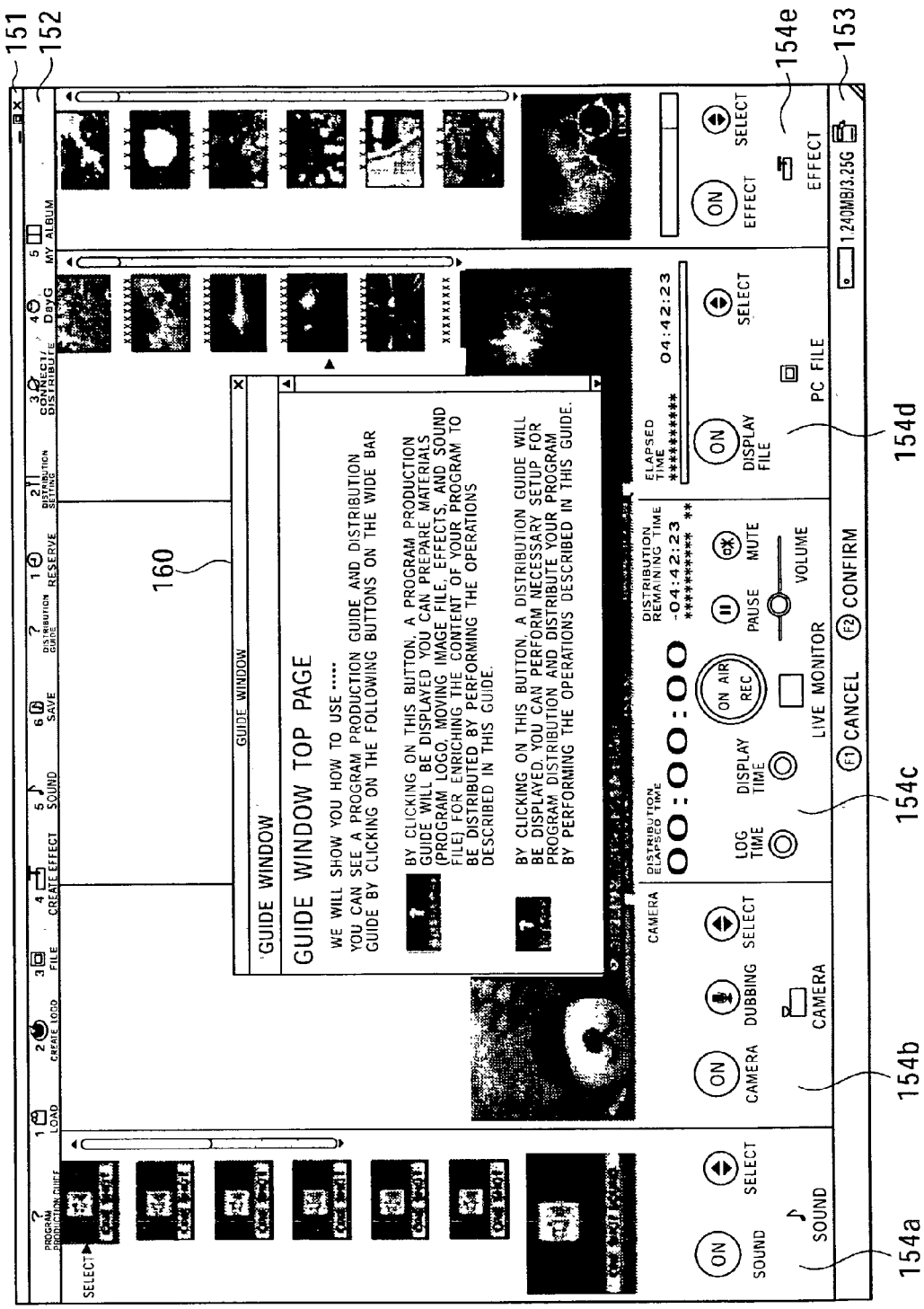
FIG. 19 is an illustration of windows including a guide window displayed on the display unit, in which the details of the windows are shown.

Specifically, referring to FIG. 19, the user terminal 10 has the guidance bar 152, which is a horizontal strip, at the top of the window. When each button in the guidance bar 152 is pressed by the user using the mouse, or when the live distribution application program is activated, if necessary, a guide window 160 serving as a description window is displayed on the display unit 55. In the user terminal 10, the state in which the display unit 55 displays the guide window 160 is referred to as a "guide mode".

Figure 20:
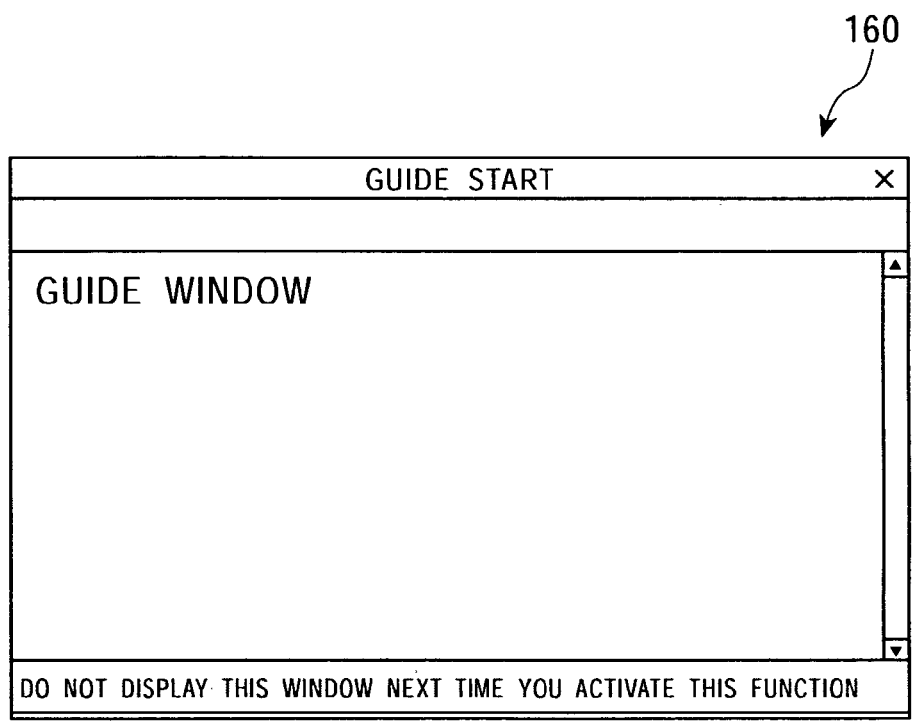
FIG. 20 is an illustration of the configuration of the guide window.

Referring to FIG. 20, the guide window 160 is a separate window with a simple configuration. In the guide window 160, a guide description corresponding to each guide is described.

When the live distribution application program is initially activated, the user terminal 10 displays, on the display unit 55, the guide window 160 for activation in which a guide description of a method for using the live distribution application program is described. The guide mode is thus provided. Unless the user explicitly performs setup not to display the guide window 160, the user terminal 10 displays the guide window 160 for activation on the display unit 55 every time the live distribution application program is activated.

The user terminal 10 offers two types of guides, namely, a program production guide and a distribution guide. The user terminal 10 displays the guide window 160 in which an instruction guide in accordance with each guide is described.

The program production guide is provided for the purpose of easily setting, among the functions of the live distribution application program, functions for making a full-fledged program. In the user terminal 10, the live distribution application program can be executed without operating functions described in this program production guide. Specifically, the program production guide describes six types of functions, namely, load functions, logo creating functions, file functions, effect creating functions, sound functions, and save functions.

In contrast, the distribution guide is provided for the purpose of easily setting-up functions that are required to actually perform live distribution on the Internet 2. In the user terminal 10, even a novice user can easily perform the necessary setup without making mistakes by performing the operations described in the distribution guide. Specifically, the distribution guide describes five types of functions, namely, reservation functions, distribution setup functions, connection/distribution functions, chat functions, and my distribution album functions.

The program production guide and the distribution guide are activated by the user pressing various buttons provided in the above-described guidance bar 152 using the mouse. In other words, the guidance bar 152 provides, as described above, two guide buttons for activating the program production guide and the distribution guide and a plurality of direct buttons for directly activating corresponding functions.

Figure 21:
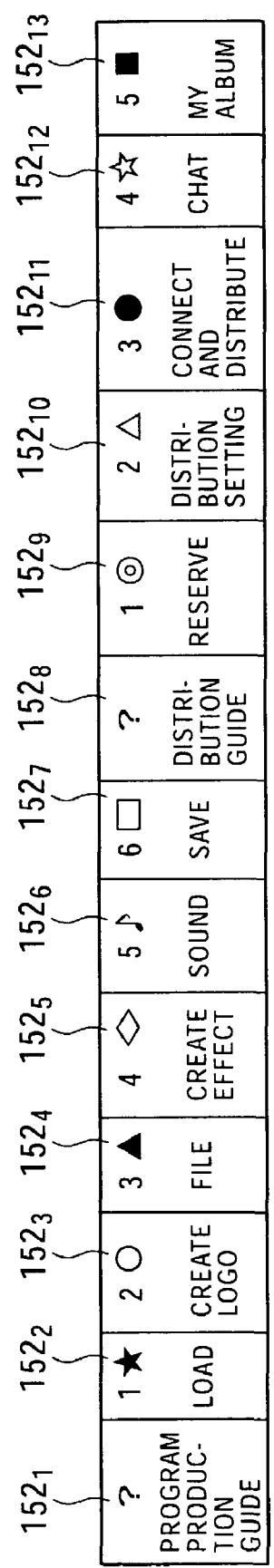
FIG. 21 is a diagram showing the configuration of a guidance bar.

Specifically, as shown in FIG. 21, the guidance bar 152 includes a program production guide button $152_1$, which is denoted by "?", for activating the program production guide, and a distribution guide button $152_8$, which is denoted by "?", for activating the distribution guide. The guidance bar 152 includes direct buttons numbered from "1" to "6" for directly activating functions described in the program production guide, namely, a load button $152_2$, a logo creating button $152_3$, a file button $152_4$, an effect creating button $152_5$, a sound button $152_6$, and a save button $152_7$. Also, the guidance bar 152 includes direct buttons numbered from "1" to "5" for directly activating functions described in the distribution guide, namely, a reservation button $152_9$, a distribution setup button $152_{10}$, a connection/distribution button $152_{11}$, a chat button $152_{12}$, and a my distribution album button $152_{13}$.

The program production guide button $152_1$ activates the program production guide. When the user uses the mouse to press the program production guide button $152_1$, the user terminal 10 displays, on the display unit 55, the guide window 160 in which guide descriptions of six types of functions for making a full-fledged program, namely, the load functions, the logo creating functions, the file functions, the effect creating functions, the sound functions, and the save functions, are described.

The load button $152_2$ is for directly activating the load function related to the program production and is represented by the numeral "1" displayed on the display screen, the numeral "1" indicating a function described in the program production guide. The load function is to read a program template, which is a combination of pre-stored materials and effects. Also, the load function is to restore the live distribution application program to the default state when the live distribution application program was purchased. For example, prior to producing a program, the user terminal 10 uses the load function to read beforehand a template, which is to be used as the basis of the program production, edits the template, and stores the edited template as a new template. As a result, the new template can be easily created. When the user presses the load button $152_2$ using the mouse, the user terminal 10 executes the load function and displays a predetermined dialog on the display unit 55. When the user terminal 10 is in the guide mode, the user terminal 10 displays the guide window 160 in which a detailed guide description of the load function is described on the display unit 55.

The logo creating button $152_3$ is to directly activate the logo creating function related to the program production and is represented by the numeral "2" displayed on the display screen, the numeral "2" indicating a function described in the program production guide. The logo creating function is to setup a program's title logo, which is to be displayed all the time during the program. For example, in actual television broadcasting, the word "Live" indicating that the program is being broadcast live or the program's symbol mark may be displayed on a display screen. The user terminal 10 can perform similar processing using the logo creating function. When the user presses the logo creating button $152_3$ using the mouse, the user terminal 10 executes the logo creating function and displays a predetermined dialog on the display unit 55. When the user terminal 10 is in the guide mode, the user terminal displays the guide window 160 in which a detailed guide description of the logo creating function is described on the display unit 55.

The file button $152_4$ is to directly activate the file function related to the program production and is represented by the numeral "3" displayed on the display screen, the numeral "3" indicating a function described in the program production guide. The file function is to list video and/or audio data stored in the hard disk of the user terminal 10 and to use the video and/or audio data as a material for performing live distribution. Specifically, with the live distribution application program, in an environment where a digital video camera is attached or connected to a terminal as in the user terminal 10, live video and/or audio data captured by the digital video camera and stored video and/or audio data can be switched between each other and distributed. With the live distribution application program, in an environment where no digital video camera is attached or connected to a terminal, only stored video and/or audio data can be used to perform live distribution. The user terminal 10 can easily perform such processing using the file function. When the user presses the file button $152_4$ using the mouse, the user terminal 10 executes the file function and displays the setup layout on the display unit 55, allowing a predetermined dialog and the above-descried panel window 154d' to be seen. When the user terminal 10 is in the guide mode, the user terminal 10 displays the guide window 160 in which a detailed guide description of the file function is described on the display unit 55.

The effect creating button 152$_5$ is to directly activate the effect creating function related to the program production and is represented by the numeral "4" displayed on the display screen, the numeral "4" indicating a function described in the program production guide. The effect creating function is to add various special effects to video data, such as to give change to video data and to combine a plurality of pieces of video data. Effects that can be added to video data include a picture effect, a bitmap effect, and a caption superimposing effect. The picture effect processes video data itself and adds a special effect such as making a sepia image or a mosaic image. The bitmap effect is to superpose animation or still image data on video data using an arbitrary bitmap. The caption superimposing effect is to superimpose an arbitrary character string on video data. The user terminal 10 can easily add special effects by using the effect creating function. When the user presses the effect creating button 152$_5$ using the mouse, the user terminal 10 executes the effect creating function and displays the setup layout on the display unit 55, allowing a predetermined dialog and a panel window for setting effects to be seen. When the user terminal 10 is in the guide mode, the user terminal 10 displays the guide window 160 in which a detailed guide description of the effect creating function is described on the display unit 55.

The sound button 152$_6$ is to directly activate the sound function related to the program production and is represented by the numeral "5" displayed on the display screen, the numeral "5" indicating a function described in the program production guide. The sound function is to synthesize audio data in accordance with the user's preferences by using various audio effects. Using the sound function, the user terminal 10 can easily register audio data to be used as a sound effect and to synthesize audio data. The user terminal 10 can individually set a loop for the registered audio data, and hence the audio data can be used as background music. When the user presses the sound button 152$_6$ using the mouse, the user terminal 10 executes the sound function and displays the setup layout on the display unit 55, allowing a predetermined dialog and a panel window for setting sound to be seen. When the user terminal 10 is in the guide mode, the user terminal 10 displays the guide window 160 in which a detailed guide description of the sound function is described on the display unit 55.

The save button 152$_7$ is to directly activate the save function related to the program production and is represented by the numeral "6" displayed on the display screen, the numeral "6" indicating a function described in the program production guide. The save function is to simultaneously save various materials for the program, which are created by performing procedures in accordance with the functions numbered from "1" to "5", that is, by executing the load function, the logo creating function, the file function, the effect creating function, and the sound function, in the hard disk. In the user terminal 10, various materials saved by the save function are incorporated into the above-described program template. As described above, the user terminal 10 can invoke the saved state at any time by reading the program template using the load function. Also, the user terminal 10 can save a material being edited and subsequently process the material. When saving a program template, the user terminal 10 can give a name to the program template in accordance with the user's preferences. Even if the number of program templates increases, the desired program template can be easily detected. When the user presses the save button 152$_7$ using the mouse, the user terminal 10 executes the save function and displays a predetermined dialog on the display unit 55. When the user terminal 10 is in the guide mode, the user terminal 10 displays the guide window 160 in which a detailed guide description of the save function is described on the display unit 55.

The distribution guide button 152$_8$ is to activate the distribution guide. When the user presses the distribution guide button 152$_8$ using the mouse, the user terminal 10 displays, on the display unit 55, the guide window 160 in which detailed guide descriptions of the foregoing five types of functions, that is, the reservation functions, the distribution setup functions, the connection/distribution functions, the chat functions, and the my distribution album functions, which are required for performing live distribution are described.

The reservation button 152$_9$ is to directly activate the reservation function related to live distribution and is represented by the numeral "1" displayed on the display screen, the numeral "1" indicating a function described in the distribution guide. The reservation function is to make reservation for using the content distribution function of the above-described streaming distribution server 40. The user terminal 10 can easily make reservation using the reservation function. When the user presses the reservation button 152$_9$ using the mouse, the user terminal 10 executes the reservation function and displays the above-described predetermined WWW browsing window on the display unit 55. When the user terminal 10 is in the guide mode, the user terminal 10 displays the guide window 160 in which a detailed guide description of the reservation function is described on the display unit 55.

The distribution setup button 152$_{10}$ is to directly activate the distribution setup function related to live distribution and is represented by the numeral "2" displayed on the display screen, the numeral "2" indicating a function described in the distribution guide. The distribution setup function is to perform various setup procedures in accordance with the communication environment of the user terminal 10, which are required for performing live distribution after reservation is made. The user terminal 10 can easily perform distribution setup procedures using the distribution setup function. When the user presses the distribution setup button 152$_{10}$ using the mouse, the user terminal 10 executes the distribution setup function and displays a predetermined wizard-format dialog on the display unit 55. When the user terminal 10 is in the guide mode, the user terminal 10 displays the guide window 160 in which a detailed guide description of the distribution setup function is described on the display unit 55.

The connection/distribution button 152$_{11}$ is to directly activate the connection/distribution function related to live distribution and is represented by the numeral "3" displayed on the display screen, the numeral "3" indicating a function described in the distribution guide. The connection/distribution function is to perform connection and distribution related to test capturing and actual distribution performed by the user pressing the button 154c$_2$ in the above-described main monitor panel window 154c. At times other than the reserved time, the button 154c$_2$ functions as a button for making a trial proof of actual distribution, that is, starting test capturing. When the reserved distribution start time is reached, the button 154c$_2$ changes to a button for automatically starting distribution. When the distribution end time is reached, a connection is automatically closed, and distribution is automatically terminated. The button 154c$_2$ automatically changes back to a button for starting test capturing. The user terminal 10 can easily perform such processing related to connection and distribution using the connection/distribution function. When the user presses the connection/distribution button $152_{11}$ using the mouse, the user terminal 10 executes the connection/distribution function. When the user terminal 10 is in the guide mode, the user terminal 10 displays the guide window 160 in which a detailed guide description of the connection/distribution function is described on the display unit 55.

The chat button $152_{12}$ is to directly activate the chat function related to live distribution and is represented by the numeral "4" displayed on the display screen, the numeral "4" indicating a function described in the distribution guide. The chat function is, as described above, to distribute a program incorporating two-way communication, such as a viewer/listener-participating-type program. The user terminal 10 can easily implement a viewer/listener-participating-type personal casting service using the chat function. When the user presses the chat button $152_{12}$ using the mouse, the user terminal 10 executes the above-described chat application program. When the user terminal 10 is in the guide mode, the user terminal 10 displays the guide window 160 in which a detailed guide description of the chat function is described on the display unit 55.

The my distribution album button $152_{13}$ is to directly activate the my distribution album function related to live distribution and is represented by the numeral "5" displayed on the display screen, the numeral "5" indicating a function described in the distribution guide. The my distribution album function, which will be described in detail below, is to store previously distributed and/or test-captured content and reservation information to be distributed in the hard disk and to arrange the stored information in the form of an album so that the user can see the stored information. The user terminal 10 can easily construct my distribution album (described below) using the my distribution album function. When the user presses the my distribution album button $152_{13}$ using the mouse, the user terminal 10 displays a predetermined window serving as my distribution album on the display unit 55. When the user terminal 10 is in the guide mode, the user terminal 10 displays the guide window 160 in which a detailed guide description of the my distribution album function is described on the display unit 55.

Accordingly, on the guidance bar 152, the load button $152_2$, the logo creating button $152_3$, the file button $152_4$, the effect creating button $152_5$, the sound button $152_6$, and the save button $152_7$ are sequentially numbered in accordance with a standard sequence of program production operations and disposed side-by-side. In the user terminal 10, when the user presses these various buttons in numerical order and executes the corresponding functions, all the functions of the live distribution application program for enriching the contents of the program can be set up. Accordingly, the user can immediately detect the types of executable functions only by looking at various buttons disposed side-by-side and can easily be easily perform these functions requiring complicated operations.

On the guidance bar 152, the reservation button $152_9$, the distribution setup button $152_{10}$, the connection/distribution button $152_{11}$, the chat button $152_{12}$, and the my distribution album button $152_{13}$ are sequentially numbered in accordance with a standard sequence of distribution operations and disposed side-by-side. In the user terminal 10, when the user presses these various buttons in numerical order and executes the corresponding functions, all the functions of the live distribution application program, which are required for performing live distribution, can be set up. Accordingly, the user can immediately detect the types of necessary functions only by looking at various buttons disposed side-by-side. Even a novice user who does not know various complicated setup procedures can easily perform various setup procedures without making a mistake.

In the user terminal 10, the guide window 160 in which an instruction guide of each function is described is displayed on the display unit 55. The user can reliably perform operations without activating an online help consisting of a huge amount of help descriptions. If the user is not performing setup, operation procedures and the details of each function can be presented to the user.

The user terminal 10 does not require various buttons provided on the guidance bar 152 to be pressed in numerical order. In other words, the user is only required to press a desired button to see a corresponding guidance description.

As described above, when the file button $152_4$, the effect creating button $152_5$, and the sound button $152_6$ are pressed, the user terminal 10 displays the setup layout on the display unit 55 in which various setup panel windows can be seen. In other words, the user terminal 10 performs operations in which the file input panel window 154d, the effect panel window 154e, and the sound panel window 154a, which have panel windows serving as setup screens, are interlocked with the file button $152_4$, the effect creating button $152_5$, and the sound button $152_6$.

Figure 22:
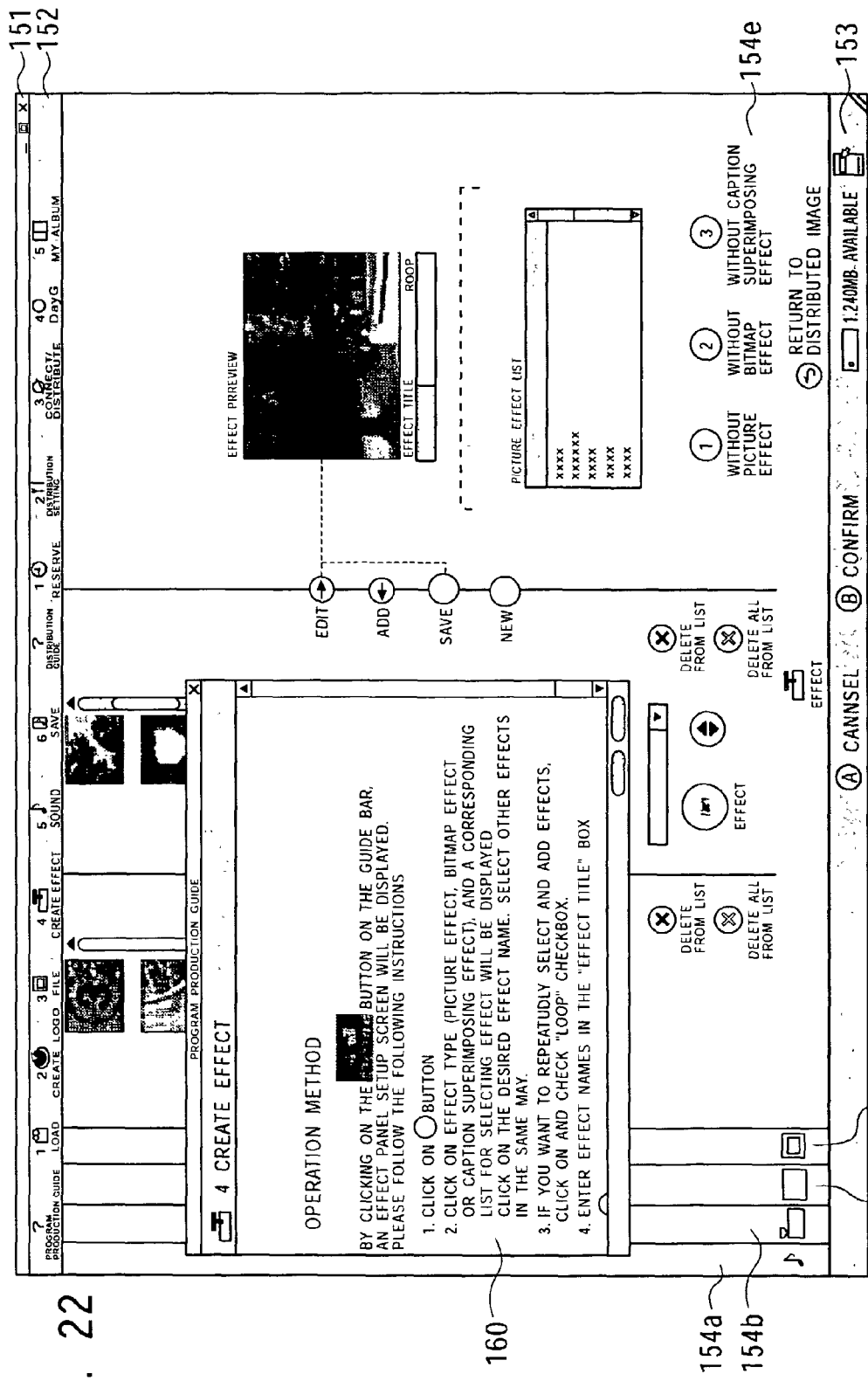
FIG. 22 is an illustration of windows displayed on the display unit, in which the details of the windows are shown, and the interlocking operation between a guide function and the operation corresponding to each function when direct buttons on the guidance bar are pressed is described.

For example, when the effect creating button $152_5$ is pressed, as shown in FIG. 22, the user terminal 10 minimizes the sound panel window 154a, the camera input panel window 154b, the main monitor panel window 154c, and the file input panel window 154d and moves the minimized windows to the left end of the display screen. At the same time, the user terminal 10 horizontally expands the effect panel window 154e on the display screen and displays the setup layout on the display unit 55, allowing a panel window for setting up the effect panel window 154e to be exposed. When the user terminal 10 is in the guide mode, the guide window 160 is displayed on the display unit 55. Thus, the user terminal 10 updates the contents of the guide window 160 to a detailed guide description of the effect creating function and displays the updated guide window 160 on the display unit 55. When the user terminal 10 is not in the guide mode, no guide window 160 is displayed on the display unit 55. Thus, no detailed guide description of the effect creating function is displayed on the display unit 55.

When the file button $152_4$, the effect creating button $152_5$, and the sound button $152_6$ are pressed, the user terminal 10 interlocks operations in accordance with the functions with the corresponding guide functions. As a result, the labor of searching the online help for a desired help description can be saved, and the more understandable graphical user interface can be provided.

When the mouse overlaps (that is, when the mouse is placed over) various items such as various buttons on the display screen, the user terminal 10 can display a tool-tip help. When the guide window 160 is displayed on the display unit 55, that is, when the user terminal 10 is in the guide mode, it is assumed that the user is a novice, and the wording of the tool-tip help can be made more detailed. In contrast, when no guide window 160 is displayed on the display unit 55, that is, when the user terminal 10 is not in the guide mode, it is assumed that the user is an experienced user, and the wording of the tool-tip help can be simplified. Long and detailed wording of the tool-tip help is unnecessary for experienced users. The longer the description, the larger the space of the display screen the tool-tip occupies. This inconvenience is taken into consideration in the present invention.

For example, when the mouse is placed over the button $154c_2$ in the above-described main monitor panel window

154*c*, the user terminal 10 changes the wording of the tool-tip help depending on the mode of the user terminal 10 (whether or not it is in the guide mode). Specifically, when in the guide mode, the user terminal 10 displays a long and detailed description, such as "At distribution reservation time, distribution will be started or stopped. At other times, test capturing will be started or stopped". When not in the guide mode, the user terminal 10 displays a concise description, such as "distribution (test capturing) start/stop".

The user terminal 10 can change the contents of a tool-tip help depending on whether or not the user terminal 10 is in the guide mode. For a novice user who needs a guide, a more understandable description is presented. For an experienced user, the tool-tip help appears as supplementary text that enables the user to confirm the function of the button.

The my distribution album function will now be described.

The user terminal 10 stores at least previous live-distributed and/or test-captured video and/or audio data as a file in the hard disk or a predetermined recording medium, and lists content formed by the video and/or audio data as my distribution album, which is an information list. As a result, the video and/or audio data can be viewed in the form of an album. The user terminal 10 can list not only the video and/or audio data stored in the hard disk or the like, but also various information related to a program, such as the program title, distribution time and date, program outline, distribution bandwidth, distribution time, and file information such as the size of the video and/or audio data recorded in the hard disk, and inserts the listed information in the my distribution album. After the program ends, the user terminal 10 can obtain feedback information such as the audience rating and comments from viewers/listeners from a predetermined live distribution service site, which is the streaming distribution server 40, and can list additional feedback information in the my distribution album. The user terminal 10 can list not only the previous distribution log but also future reservation information to be distributed. The user terminal 10 provides the my distribution album function.

Figure 23:
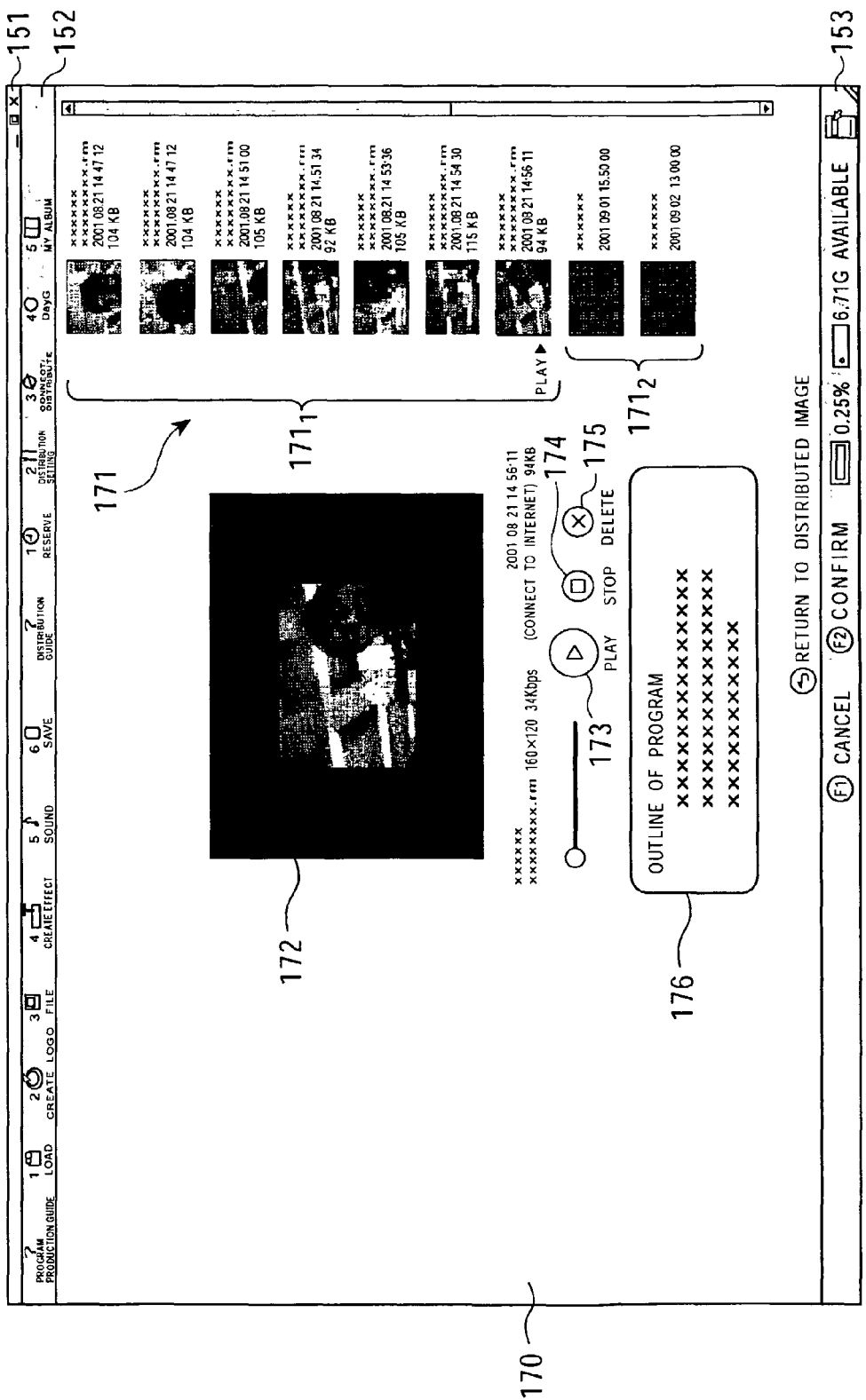
FIG. 23 is an illustration of windows including my distribution album window displayed on the display unit, in which the details of the windows are shown.

Specifically, when the my distribution album button $152_{13}$ provided on the guidance bar 152 is pressed, the user terminal 10 displays, as shown in FIG. 23, a my distribution album window 170 on the display unit 55, instead of the above-described panel windows 154*a*, 154*b*, 154*c*, 154*d*, and 154*e*.

The my distribution album window 170 provides a list area 171 for listing and displaying in time series a thumbnail area $171_1$ for displaying a thumbnail image indicating a list of video and/or audio data and a reservation area $171_2$ indicating a list of future reservation information to be distributed; a preview area 172 for previewing the first page of static image data forming the video and/or audio data selected from the list using a mouse or the like; a button 173 for playing or pausing the video and/or audio data displayed in the preview area 172; a button 174 for stopping the video and/or audio data displayed in the preview area 172; a button 175 for deleting video and/or audio data from the list; and a program outline area 172 for displaying the program outline of the video and/or audio data displayed in the preview area 172. In the my distribution album 170, a properties area belonging to the preview area 172 includes various information such as the program title, distribution start time and date, distribution end time and date, file name of the thumbnail image, file name of the video and/or audio data, the size of the video and/or audio data, program outline, and distribution bandwidth. In the my distribution album 170, when reservation information is selected, no static image data is displayed in the preview area 172.

The user terminal 10 for displaying the above-described the my distribution album window 170 on the display unit 55 constructs the my distribution album by recording the foregoing information as a distribution log file, which is distribution log information, in the hard disk or the like.

When the user terminal 10 performs live distribution at a reserved time and date, the user terminal 10 records the distributed video and/or audio data as a file in the hard disk or the like. When recording the video and/or audio data in the hard disk, under the control of the CPU 51 functioning as a distribution log creator, the user terminal 10 obtains the first page of the static image data forming the video data as a thumbnail image and lists the obtained thumbnail image in the my distribution album.

When the user terminal 10 completes live distribution, under the control of the CPU 51 functioning as the distribution log creator, the user terminal 10 obtains the distribution period and the size of the video and/or audio data recorded in the hard disk and stores the obtained information and the reservation information in a distribution log file. The distribution log file includes various information such as the program title, the distribution start time and date, the distribution end time and date, the file name of the thumbnail image, the file name of the video and/or audio data, the size of the video and/or audio data, the program outline, and the distribution bandwidth. Under the control of the CPU 51 functioning as a list creator, the user terminal 10 reads a distribution log file for each program, lists the read distribution log files, and constructs the my distribution album.

When live distribution is interrupted, the user terminal 10 records video and/or audio data distributed until the interruption as a file and records the file in the hard disk or the like. When live distribution is resumed, the user terminal 10 creates a new file including the video and/or audio data. Thus, when one piece of video and/or audio data is divided into pieces and separate pieces are distributed live, the video and/or audio data can be easily detected.

After the live distribution ends, under the control of the CPU 51 functioning as the distribution log creator, the user terminal 10 downloads a program distribution information file from the streaming distribution server 40 and thus obtains feedback information related to the distributed program. The program distribution information file includes various feedback information such as the total number of viewers/listeners, the number of viewers/listeners at predetermined intervals, the audience rating, and information written in a bulletin board system (BBS) including comments on the program from viewers/listeners, and log data indicating the contents of a chat when the above-described chat application program is simultaneously activated. Under the control of the CPU 51 functioning as the list creator, the user terminal 10 reads a program distribution information file for each program and lists the read program distribution information files, thus constructing the my distribution album.

Figure 24:
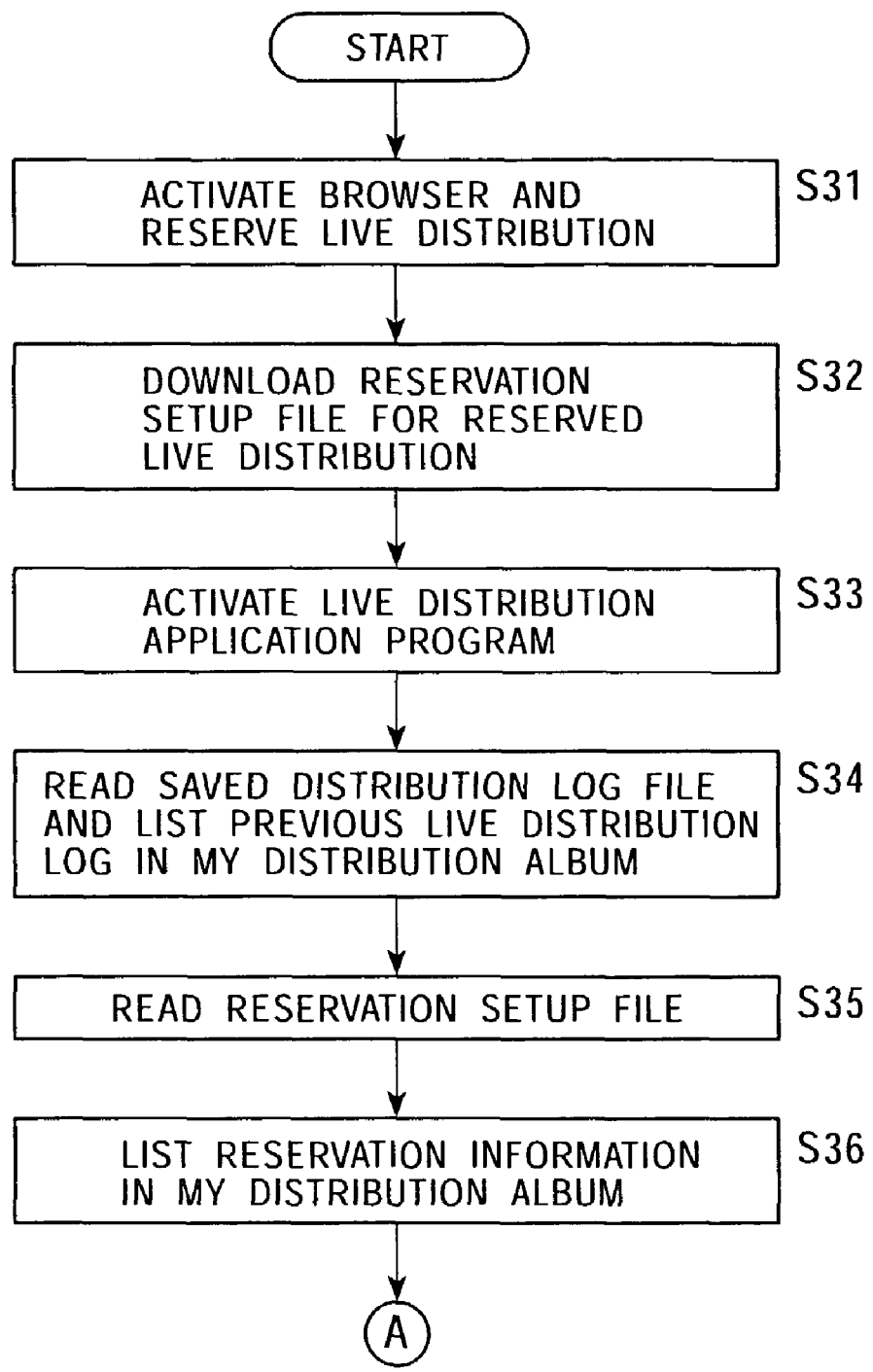
FIG. 24 is a flowchart showing a process of constructing, by the user terminal, the my distribution album in which steps from the beginning to listing reservation information in the my distribution album are illustrated.
Figure 25:
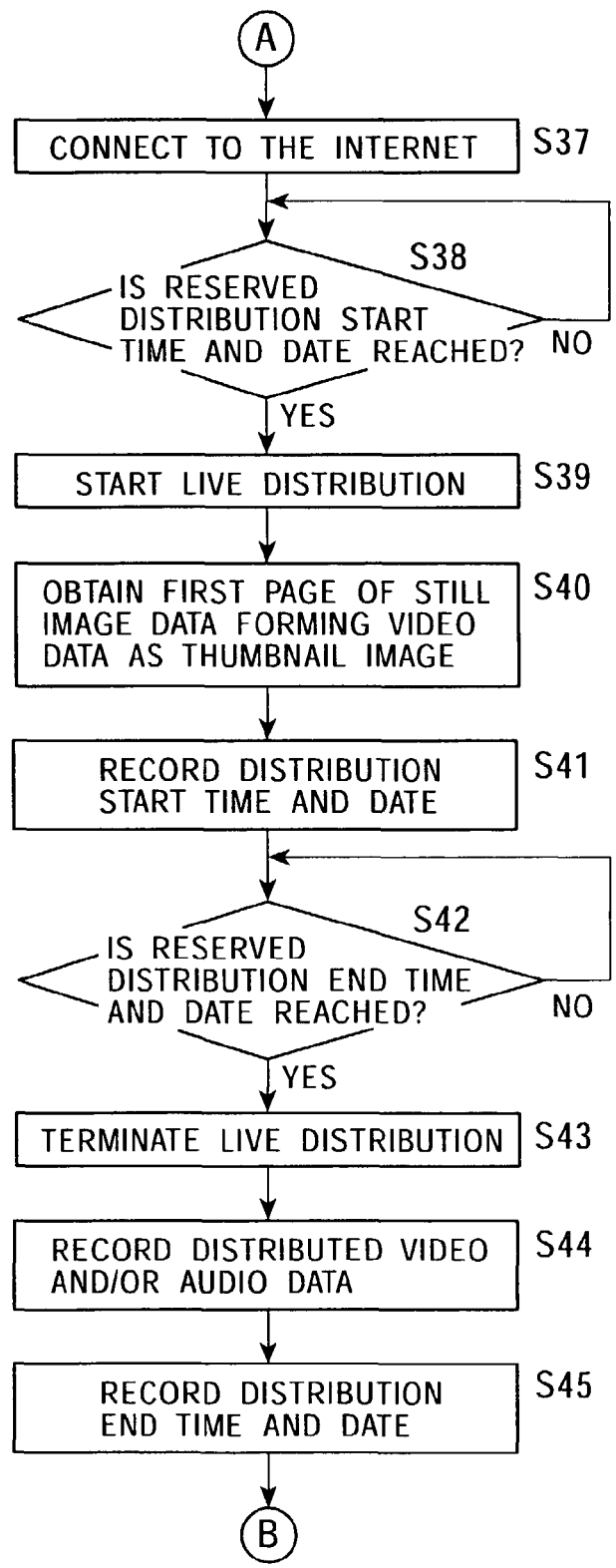
FIG. 25 is a flowchart showing the process of constructing, by the user terminal, the my distribution album in which steps subsequent to those shown in FIG. 24 are illustrated.
Figure 26:
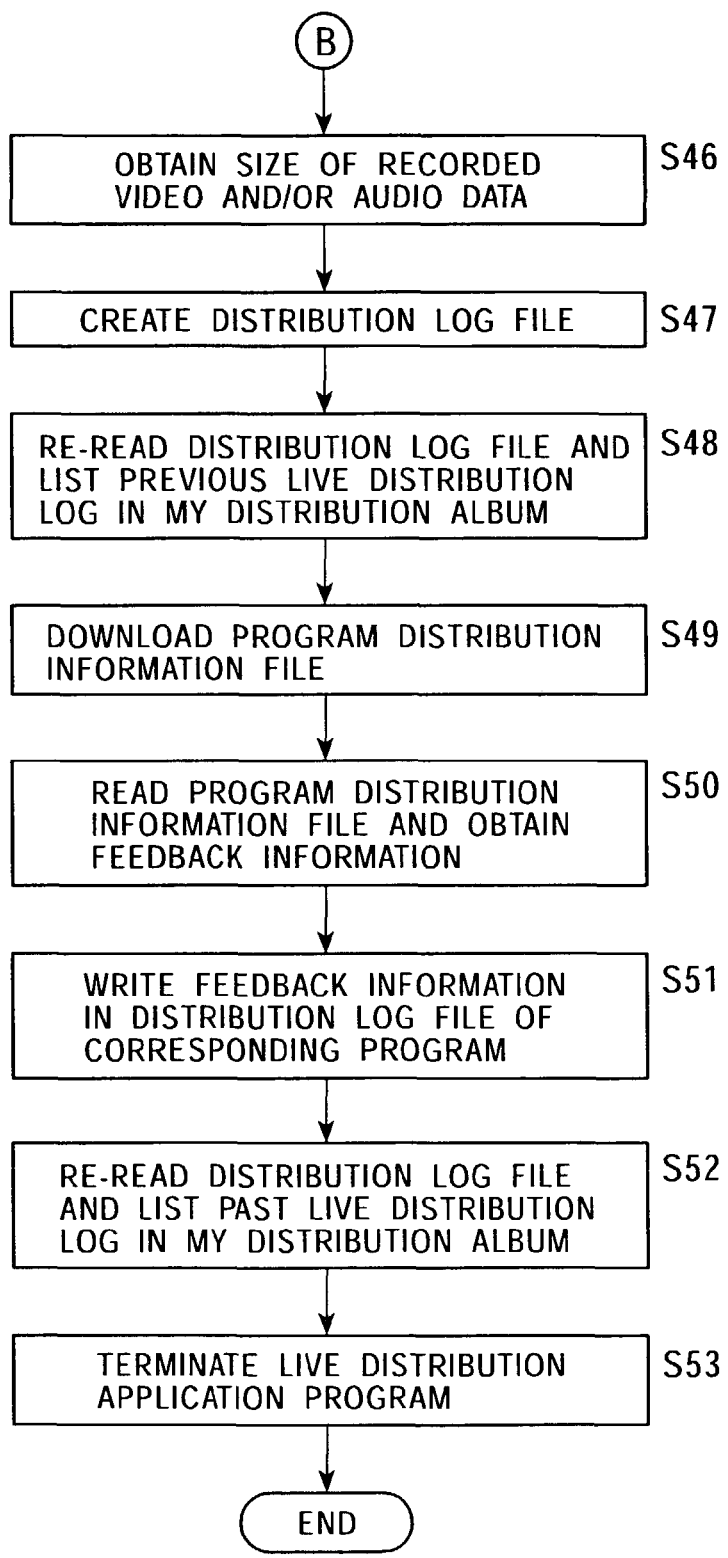
FIG. 26 is a flowchart showing the process of constructing, by the user terminal, the my distribution album in which steps subsequent to those shown in FIG. 25 are illustrated.

The user terminal 10 obtains these various pieces of information and constructs the my distribution album by performing processes shown in FIGS. 24 to 26.

Referring to FIG. 24, in step S31, the user terminal 10 activates a browser for connecting to the Internet 2 and reserves live distribution at the server use reservation management center 30.

In step S32, as described above, under the control of the CPU 51 functioning as the distribution log creator, the user terminal 10 downloads a reservation setup file from the server use reservation management center 30.

In step S33, the user terminal 10 activates the live distribution application program.

In step S34, under the control of the CPU 51 functioning as the list creator, the user terminal 10 reads the distribution log file stored in the hard disk and lists the previous live distribution log in the my distribution album.

In step S35, under the control of the CPU 51 functioning as the list creator, the user terminal 10 reads the downloaded reservation setup file. In step S36, the user terminal 10 lists reservation information described in the reservation setup file, that is, the program title, the distribution start time and date, the distribution end time and date, and the program outline, in the my distribution album.

Referring to FIG. 25, in step S37, the user terminal 10 connects to the Internet 2. In step S38, the user terminal 10 determines whether or not the reserved distribution start time and date is reached.

If the reserved distribution start time and date is not reached, the user terminal 10 repeats processing in step S38. When the reserved distribution start time and date is reached, in step S39, the user terminal 10 starts live distribution when the user presses the button $154c_2$ in the main monitor panel window 154c.

In step S40, after distribution starts, under the control of the CPU 51 functioning as the distribution log creator, the user terminal 10 obtains the first page of static image data forming the video data as a thumbnail image and records the obtained image in the hard disk or the like. In step S41, the user terminal 10 records the distribution start time and date in the hard disk or the like.

In step S42, the user terminal 10 determines whether or not the reserved distribution end time and date is reached.

If the reserved distribution end time and date is not reached, the user terminal 10 repeats processing in step S42. If the reserved distribution end time and date is reached, in step S43, the user terminal 10 terminates live distribution when the user presses the button $154c_2$ in the main monitor panel window 154c.

In step S44, the user terminal 10 stores the distributed video and/or audio data in the hard disk or the like. In step S45, the user terminal 10 records the distribution end time and date in the hard disk or the like.

Referring to FIG. 26, in step S46, under the control of the CPU 51 functioning as the distribution log creator, the user terminal 10 obtains the size of the video and/or audio data recorded in the hard disk or the like. In step S47, the user terminal 10 creates a distribution log file and records the program title, the distribution start time and date, the distribution end time and date, the file name of the thumbnail image, the file name of the video and/or audio data, the size of the video and/or audio data, the program outline, and the distribution bandwidth.

In step S48, under the control of the CPU 51 functioning as the list creator, the user terminal 10 re-reads the distribution log file, which is stored in step S47 in the hard disk, and lists the live distribution log in the my distribution album.

In step S49, under the control of the CPU 51 functioning as the distribution log creator, the user terminal 10 downloads a program distribution information file from the streaming distribution server 40. In step S50, under the control of the CPU 51 functioning as the list creator, the user terminal 10 reads the downloaded program distribution information file and obtains various feedback information such as the number of viewers/listeners and log data indicating the contents of a chat.

In step S51, under the control of the CPU 51 functioning as the distribution log creator, the user terminal 10 writes various feedback information described in the program distribution information file, which is obtained in step S50, in the distribution log file for the corresponding program.

In step S52, under the control of the CPU 51 functioning as the list creator, the user terminal 10 re-reads the distribution log file stored in the hard disk and lists the live distribution log in the my distribution album. In step S53, the user terminal 10 terminates the live distribution application program, and the process is terminated.

By performing the foregoing process, the user terminal 10 can obtain the live-distributed video and/or audio data and various information related to the video and/or audio data and construct the my distribution album. By performing similar processing, the user terminal 10 can also construct my distribution album including video and/or audio data obtained by test capturing.

The user terminal 10 constructs the my distribution album in this manner. As described above, when the my distribution album button $152_{13}$ provided on the guidance bar 152 is pressed by the user using the mouse, the user terminal 10 displays the my distribution album window 170 shown in FIG. 23 on the display unit 55. From among the video and/or audio data listed in the my distribution album window 170, desired video and/or audio data is selected by the user using the mouse. In response to this, the user terminal 10 displays the first page of static image data in the preview area 172. When the button 173 is pressed by the user using the mouse, the user terminal 10 plays the video and/or audio data. Accordingly, the user can see the desired video and/or audio data.

Since the user terminal 10 provides the my distribution album function, the user terminal 10 can list in time-series the distribution log and reservation information and can provide an interface which is easy to understand and which has advantages in detecting video and/or audio data to the user.

As described above, in the personal broadcasting system 1, when the user terminal 10 activates the live distribution application program and performs live distribution, the user terminal 10 seamlessly changes between the panel windows forming the window serving as the main screen and the panel window serving as the setup screen, and the functions are grouped into units of panel windows. Thus, the panel windows forming the window serving as the main screen can be displayed in the same display manner as the panel window serving as the setup screen on the display unit 55. Thus, the user terminal 10 can clarify the association between the main screen and the setup screen and provide to the user an easy-to-understand graphical user interface which is highly entertaining and user-friendly. Accordingly, it becomes very convenient for the user.

The present invention is not limited to the foregoing embodiment. For example, in the foregoing embodiment, the present invention is applied to the user terminal 10 formed by an information processing apparatus, such as a personal computer to which a digital video camera is attached or connected. The present invention is applicable to any type of electronic apparatus as long as it has an image capturing function and a display screen.

For example, the present invention can be applied to various types of information processing apparatuses, such as a video camera, a cellular phone with a camera, and a PDA with a camera, which have a short-distance wireless communication function, such as the so-called Bluetooth (trademark), and which can connect to the Internet via a cellular phone or a modem adapter without using a personal computer. Specifically, although the digital video camera is used in the foregoing embodiment, the present invention is applicable to cases in which various cameras, such as a USB (Universal Serial Bus) camera and a built-in camera included in a notebook personal computer, are used.

In the foregoing embodiment, the user terminal 10 executes the live distribution application program formed by various modules shown in FIG. 7. According to the present invention, the live distribution application program can include other modules corresponding to other functions. Thus, the present invention can display panel windows corresponding to various functions.

In the foregoing embodiment, the window functioning as the main screen is vertically divided on the display screen into a plurality of panel windows 154a, 154b, 154c, 154d, and 154e corresponding to a plurality of functions, and the panel windows 154a, 154b, 154c, 154d, and 154e are displayed side-by-side on the display unit 55. The present invention is also applicable to a case in which the window serving as the main screen is divided into separate panel windows in a predetermined direction and the separate panel windows are disposed next to each other and displayed. For example, the window serving as the main screen can be horizontally divided on the display screen into a plurality of panel windows corresponding to a plurality of functions, and the plurality of panel windows can be disposed next to each other and displayed. In a case where the window serving as the main screen is horizontally divided on the display screen and separate panel windows are disposed next to each other and displayed, when the display screen is changed from the distributing layout to the setup layout, each panel window is expanded or contracted in a predetermined direction, namely, in the vertical direction, which is perpendicular to the horizontal direction.

According to the present invention, various buttons provided on the guidance bar include not only those displayed in FIG. 21 but also buttons corresponding to various functions if necessary.

In the foregoing embodiment, the guidance bar 152 and the status bar 153 are horizontal strips and are disposed at the top and bottom of the window. According to the present invention, the guidance bar and the status bar can be of different forms, such as the form of a palette. Also, the positions of the guidance bar and the status bar are not limited to those in the foregoing embodiment.

Accordingly, the present invention is intended to cover various modifications and equivalent arrangements included within the spirit and scope thereof.

What is claimed is:

1. An information processing apparatus comprising:
    display means for displaying a window on a display screen; and
    control means for controlling the display of the window including a plurality of panel windows, a status bar and a guidance bar, the panel windows are arranged along a predetermined direction which is one of vertical and horizontal directions on the display screen, the plurality of panel windows correspond to a plurality of functions, and the control means causes the display means to display the panel windows immediately adjacent one another and extending between the status bar and the guidance bar,
    wherein the control means controls a contraction and an expansion of the panel windows the predetermined direction on the display screen, and the control means expands a panel window, which corresponds to a function selected by a user, toward a center of the display screen, displays an expanded setup window immediately adjacent to the expanded panel window, the setup window being associated with the expanded window and allows the user to setup the contents of the expanded panel window, and simultaneously contracts only a width of a plurality of the panel windows that are not the window to be expanded, such that the contracted panel windows are located from a position immediately adjacent a side of the expanded panel window to a first end of the display screen and a side of the setup window to a second end of the display screen, the contraction of the windows to the ends of the display screen hides each button provided inside the contracted panel windows,
    wherein during contraction and expansion, the guidance bar and status bar remain visible and extend completely across the window on the display screen, the guidance bar being configured to display and control a plurality of functions corresponding to a function for each of the plurality of panel windows, and
    wherein the plurality of panel windows extend between the status bar and the guidance bar when the panel window is both contracted and expanded.

2. An information processing apparatus according to claim 1, wherein, among the plurality of panel windows forming the window serving as the main screen, the panel window including the items which need to be setup is formed by sharing part of the panel window serving as the setup screen.

3. An information processing apparatus according to claim 1, further comprising maintaining means for maintaining an upper management module, which is a module executed by the control means and which manages positional information related to the plurality of panel windows forming the window serving as the main screen on the display screen, and a plurality of panel modules, which are modules executed by the control means and which have the corresponding panel windows forming the window serving as the main screen,
    wherein the management module determines the disposition of the plurality of panel windows forming the window serving as the main screen on the display screen on the basis of layout information in accordance with the display screen, and
    the plurality of panel modules cause the display means to display, under the control of the management module, the corresponding panel windows forming the window serving as the main screen.

4. An information processing apparatus according to claim 3, wherein the management module obtains information indicating the resolution of the display screen.

5. An information processing apparatus according to claim 4, wherein the management module determines the disposition of the plurality of panel windows forming the window serving as the main screen on the display screen on the basis of the layout information in accordance with the resolution of the display screen.

6. A screen display method, comprising the steps of:
  displaying a window on a display screen;
  controlling the display of the window including a plurality of panel windows, a status bar and a guidance bar, the panel windows are arranged along a predetermined direction which is one of vertical and horizontal directions on the display screen, the plurality of panel windows correspond to a plurality of functions and are displayed immediately adjacent one another and extending between the status bar and the guidance bar;
  contracting and expanding the panel windows in the predetermined direction on the display screen;
  expanding a panel window, which corresponds to a function selected by a user, toward a center of the display screen;
  displaying an expanded setup window immediately adjacent to the expanded panel window, the setup window is associated with the expanded window and allows the user to setup the contents of the expanded panel window;
  simultaneously contracting only a width of a plurality of the panel windows that are not the window to be expanded, such that the contracted panel windows are located from a position immediately adjacent a side of the expanded panel window to a first end of the display screen and a side of the setup window to a second end of the display screen, the contraction of the windows to the ends of the display screen hides each button provided inside the contracted panel windows; and
  controlling with the guidance bar, a plurality of functions displayed on the guidance bar corresponding to a function for each of the plurality of panel windows,
  wherein during expanding and contracting of the panel windows, the guidance bar and status bar remain visible and extend completely across the window of the display screen, and
  wherein the plurality of panel windows extend between the status bar and the guidance bar when the panel window is both contracted and expanded.

7. A screen display method according to claim 6, wherein, among the plurality of panel windows forming the window serving as the main screen, the panel window including the items which need to be setup is formed by sharing part of the panel window serving as the setup screen.

8. A screen display method according to claim 6, wherein an upper management module for managing positional information related to the plurality of panel windows forming the window serving as the main screen on the display screen and a plurality of panel modules having the corresponding panel windows forming the window serving as the main screen are provided,
  the disposition of the plurality of panel windows forming the window serving as the main screen on the display screen is determined by the management module on the basis of layout information in accordance with the display screen, and
  the display means is caused by the plurality of panel modules to display, under the control of the management module, the corresponding panel windows forming the window serving as the main screen.

9. A screen display method according to claim 8, wherein information indicating the resolution of the display screen is obtained by the management module.

10. A screen display method according to claim 9, wherein the disposition of the plurality of panel windows forming the window serving as the main screen on the display screen is determined by the management module on the basis of the layout information in accordance with the resolution of the display screen.

11. A non-transitory computer readable medium including computer executable instructions, wherein the instructions, when executed by a processor, cause the processor to perform a method comprising the steps of:
  displaying a window on a display screen;
  controlling the display of the window including a plurality of panel windows, a status bar and a guidance bar, the panel windows are arranged along a predetermined direction which is one of vertical and horizontal directions on the display screen, the plurality of panel windows correspond to a plurality of functions and are display immediately adjacent one another and extending between the status bar and the guidance bar;
  contracting and expanding the panel windows in the predetermined direction on the display screen;
  expanding a panel window, which corresponds to a function selected by a user, toward a center of the display screen;
  displaying an expanded setup window immediately adjacent to the expanded panel window, the setup window is associated with the expanded window and allows the user to setup the contents of the expanded panel window;
  simultaneously contracting only a width of a plurality of the panel windows that are not the window to be expanded, such that the contracted panel windows are located from a position immediately adjacent side of the expanded panel window to a first end of the display screen and a side of the setup window to a second end of the display screen, the contraction of the windows to the ends of the display screen hides each button provided inside the contracted panel windows; and
  controlling with the guidance bar, a plurality of functions displayed on the guidance bar corresponding to a function for each of the plurality of panel windows,
  wherein during expanding and contracting of the panel windows, the guidance bar and status bar remain visible and extend completely across the window of the display screen, and
  wherein the plurality of panel windows extend between the status bar and the guidance bar when the panel window is both contracted and expanded.

12. A recording medium having recorded therein a computer-controllable screen display program, the program comprising the steps of:
  displaying a window on a display screen;
  controlling the display of the window including a plurality of panel windows, a status bar and a guidance bar, the panel windows are arranged along a predetermined direction which is one of vertical and horizontal directions on the display screen, the plurality of panel windows correspond to a plurality of functions and are displayed immediately adjacent one another and extending between the status bar and the guidance bar;
  contracting and expanding the panel windows in the predetermined direction on the display screen;
  expanding a panel window, which corresponds to a function selected by a user, toward a center of the display screen;
  displaying an expanded setup window immediately adjacent to the expanded panel window, the setup window is associated with the expanded window and allows the user to setup the contents of the expanded panel window;
  simultaneously contracting only a width of a plurality of the panel windows that are not the window to be expanded, such that the contracted panel windows are located from a position immediately adjacent a side of the expanded panel window to a first end of the display screen and a side of the setup window to a second end of the display screen, the contraction of the windows to the ends of the display screen hides each button provided inside the contracted panel windows; and controlling with the guidance bar, a plurality of functions displayed on the guidance bar corresponding to a function for each of the plurality of panel windows, wherein during expanding and contracting of the panel windows, the guidance bar and status bar remain visible and extend completely across the window of the display screen, and wherein the plurality of panel windows extend between the status bar and the guidance bar when the panel window is both contracted and expanded.

* * * * *